US006128681A

United States Patent [19]

Shephard

[11] Patent Number: 6,128,681

[45] Date of Patent: Oct. 3, 2000

[54] SERIAL TO PARALLEL AND PARALLEL TO SERIAL, CONVERTER FOR A DIGITAL AUDIO WORKSTATION

[75] Inventor: Kent L. Shephard, Hayward, Calif.

[73] Assignee: Avid Technology, Inc., Tewksbury, Mass.

[21] Appl. No.: 08/908,238

[22] Filed: Aug. 7, 1997

[51] Int. Cl.[7] ..................... G06F 13/12

[52] U.S. Cl. ..................... 710/71; 710/38

[58] Field of Search ..................... 379/284; 375/220; 386/111; 395/306; 711/105; 345/520; 178/17.5; 360/15; 710/71, 38

[56] References Cited

U.S. PATENT DOCUMENTS

| | | | |
|---|---|---|---|
| 4,727,509 | 2/1988 | Johnson et al. | 360/15 |
| 4,740,955 | 4/1988 | Litterer et al. | 178/17.5 |
| 4,835,346 | 5/1989 | Setton et al. | 178/17.5 |
| 5,018,013 | 5/1991 | Rabbi | 358/181 |
| 5,297,231 | 3/1994 | Miller | 395/2.1 |
| 5,553,220 | 9/1996 | Keene | 345/520 |
| 5,893,136 | 4/1999 | Stolt et al. | 711/105 |

FOREIGN PATENT DOCUMENTS

| | | | |
|---|---|---|---|
| 30628/95 | 3/1996 | Australia | G11B 27/031 |
| 0 656 583 A1 | 6/1995 | European Pat. Off. | G05F 7/48 |

*Primary Examiner*—Albert De Cady
*Assistant Examiner*—David Ton
*Attorney, Agent, or Firm*—Kenneth L. Milik; Lawrence E. Monks

[57] ABSTRACT

A serial to parallel interface for coupling multiple channels of audio input data to a digital audio workstation (DAW) having at least one processor capable of performing digital signal processing functions is formed from a programmable ASIC. The serial to parallel interface includes configuration registers which may be programmed to allow the interface to communicate with external audio devices that are operating in any audio format and bit width format. The serial to parallel interface includes a double buffered input and output serial datapath. The double buffered input and output datapath eases timing constraints between the interface and the DSP, thus allowing the DSP the flexibility of being able to read data at almost any point during an audio data transmission period. In addition, the double buffering mechanism within the serial to parallel interface allows for sample receipt errors to be isolated from the DSP, thereby ensuring the integrity of the audio data before it is propagated to the DAW. State machines, internal to the serial to parallel interface, provide control signals to the double buffered datapath in accordance with an external clocking signal associated with the external audio devices, and thus the serial to parallel interface is able to communicate with external devices operating at any frequency without modification. In addition, because the serial to parallel interface is implemented in a single ASIC, it is able to provide a communication link for an increased number of channels and thereby improve the operability of the DAW.

33 Claims, 13 Drawing Sheets

SERIAL TO PARALLEL AND PARALLEL TO SERIAL, CONVERTER FOR A DIGITAL AUDIO WORKSTATION

FIELD OF THE INVENTION

This invention relates generally to the field of digital audio computing and more specifically to a method and apparatus for providing a serial to parallel interface in a digital audio workstation.

BACKGROUND OF THE INVENTION

Digital audio workstations (DAWs) are gaining popularity in the recording studio and post-production environments. Digital audio workstations are used to mix, amplify, control and otherwise affect either the audio portion of a multimedia event or a production which is solely audio, such as a song or composition. Two important features desirable in any DAW are the DAW's ability to perform audio "tasks" (such as equalization, reverberation, etc.) in a real-time, efficient manner and the ability of the DAW to handle a number of tasks simultaneously or nearly simultaneously.

Each DAW typically includes a host computer and potentially one or more digital signal processors (DSPs). Where there are no DSPs, the host computer performs digital signal processing functions. The DSPs may be specialized, where each DSP performs one, unique task, or alternatively it may be general purpose; i.e., none of the DSPs are specialized but are provided as a random, general purpose DSP "pool" where any DSP can perform any number of different tasks. The host computer allocates tasks among the specialized and general purpose DSPs that are available.

Typically, analog audio data, provided via tape, synthesizer or the like, is translated into a digital audio data stream for input to the DAW by an analog to digital converter. Example A/D converters include the 888 Input/Output (I/O) audio Interface, manufactured by DIGIDESIGN, Inc., Avid Audio division, Avid Technologies, Tewksbury, Mass. Each of the Protools audio interfaces receive eight channels of analog input/output and provide eight channels of serial digital audio input/output.

Thus, the A/D converter provides a serial stream of digital audio data. To maximize performance, the DSPs generally operate on data in parallel. Therefore, a serial to parallel interface is provided either external to the DSP, or is included within the DSP. Historically, the conversion of data between the serial format and the parallel format was performed using hardwired interface logic that included shift registers and the like. Because discrete logic devices were used in the interface logic, the serial to parallel interface was not able to flexibly support varying operating environments. For example, audio data may be received in a number of input formats, including, among others, an $I^2S$ format, for A/D converters manufactured by Phillips corporation, and an SSI format, for A/D converters manufactured by Motorola corporation. Each of the different formats has different timing characteristics, and the received digital audio data is interpreted differently in each of the formats. Because prior art interfaces were hardwired, either a separate interface had to be provided to support each of the variety of different input formats or the overall system would be able to support only one format. In addition, the prior art methods of providing a serial to parallel interface were similarly inflexible to changes in frequency of input serial audio data. Providing separate interfaces to support a variety of formats and/or frequencies undesirably uses a large amount of area on the digital signal processing board.

An additional drawback of the prior art interfaces was that they were designed to support a fixed number of channels. In particular, when the serial to parallel interface was provided internally to the DSP, only a maximum of two to four channels could be supported due to the available Input/Output pins and logic gates associated with supporting each channel. If it was desired to couple more than four channels of I/O audio data, additional digital signal processors would have to be added to the system. However, adding more digital signal processors to the system results in a more expensive, potentially less marketable system. Because the number of channels that a DAW is able to accommodate is one component of the performance of the overall system, limiting the number of channels because of area and pin constraints incurred by interface logic is undesirable.

An additional problem of the prior art interfaces arose because a potential existed for erroneous data to be forwarded to the digital signal processor. Typically, each serial digital audio signal was received at the interface with an accompanying clock signal that was used to clock the received data into the shift registers. Data from the shift registers was periodically read by the digital signal processor. If an error occurred such that the clock signal was delayed or disabled, an entire twenty-four bit signal group would not be shifted into the shift register. As a result, when the digital signal processor next read the shift register, erroneous data was forwarded to the digital signal processor. The erroneous data resulted in undesirable audio output, the desired digital audio signal was often unrecoverable.

Thus, the prior art interface mechanisms provided between the serial A/D converter and the digital signal processor were inflexible to changes in data format and frequency and additionally prone to error. It would therefore be desirable to provide an interface that would be able to handle multiple data formats, multiple frequencies and preclude the propagation of erroneous data to the DSP.

SUMMARY OF THE INVENTION

A serial to parallel input, and parallel to serial output, interface (hereafter, simply "serial to parallel interface") of the present invention is provided for coupling multiple channels of audio input data to a digital audio workstation (DAW) having at least one processor capable of performing digital signal processing functions. The serial to parallel interface is advantageously formed from a programmable device. The serial to parallel interface includes configuration registers which may be programmed to allow the interface to communicate with external audio devices that are operating in any audio format and bit width format. State machines, internal to the serial to parallel interface, provide control signals responsive to the external clock sample rate, and thus the serial to parallel interface is able to communicate with external devices operating at any frequency without modification. The serial to parallel interface includes a double buffered input and output serial datapath. The double buffered input and output datapath eases timing constraints between the interface and the DSP, thus allowing the DSP the flexibility of being able to read data at almost any point during an audio data transmission period. In addition, the double buffering mechanism within the serial to parallel interface allows for audio data errors to be isolated from the DSP, thereby ensuring the integrity of the audio data before it is propagated to the DAW. In addition, the serial to parallel interface is implemented in a single ASIC, and is therefore able to provide a communication link for an increased number of channels to improve the operability of the DAW.

According to one aspect of the invention, a serial to parallel interface for coupling at least one audio device capable of transmitting and receiving at least one serial digital audio signal to a digital audio workstation is provided. The digital audio workstation includes at least one processor performing digital signal processing functions and capable of transmitting and receiving a parallel plurality of digital audio signals. The serial to parallel interface includes a programmable configuration register for identifying a format of the serial digital audio data from a plurality of available formats. In addition, the serial to parallel interface also includes at least one state machine, coupled to the programmable configuration register, for controlling the transfer of data between the signal processor and the at least one audio device such that the serial digital audio data is transferred according to the format indicated in the programmable configuration register. At least one datapath is coupled to the at least one state machine for transferring the serial digital audio data and the parallel plurality of audio data to and from the audio device and the processor, respectively, responsive to control signals from the at least one state machine.

According to another aspect of the invention, a digital audio workstation for storing and manipulating at least one serial digital audio data stream received from at least one coupled audio device includes a processor capable of performing digital signal processing functions and a serial to parallel interface, coupled to the at least one audio device and to the processor. The serial to parallel interface is programmable by the processor to interpret the at least one serial digital audio data stream as being in one of a plurality of available formats. The processor is coupled to the serial to parallel interface via a multi-bit bus, with the serial to parallel interface for converting the serial digital audio data stream to a parallel data stream for transmission on the multi-bit bus, and for converting parallel data streams on the multi-bit bus into serial digital audio data streams for transmission to the at least one coupled audio device.

According to a further aspect of the invention, a method of interfacing at least one audio device providing a serial digital audio data stream to a multi-bit bus in a digital audio workstation includes the steps of programming a configuration register to identify a format of the serial digital audio data stream, where the serial digital audio data stream may be in a plurality of formats, and exchanging data between a shift register, coupled to the serial digital audio data stream, and at least one register coupled to the multi-bit bus using and intermediate holding register, wherein data is precluded from being transferred to the at least one register coupled to the multi-bit bus responsive to an error in the receipt of the serial digital audio data stream, in order to isolate the multi-bit bus from the error.

BRIEF DESCRIPTION OF THE DRAWINGS

The above-mentioned and other features of the invention will now become more apparent by reference the following description taking in connection with the accompanying drawings in which.

DESCRIPTION OF ILLUSTRATIVE EMBODIMENTS

The present invention will be more completely understood through the following detailed description which should be read in conjunction with the attached drawings in which similar reference numbers indicate similar structures.

Figure 1A:
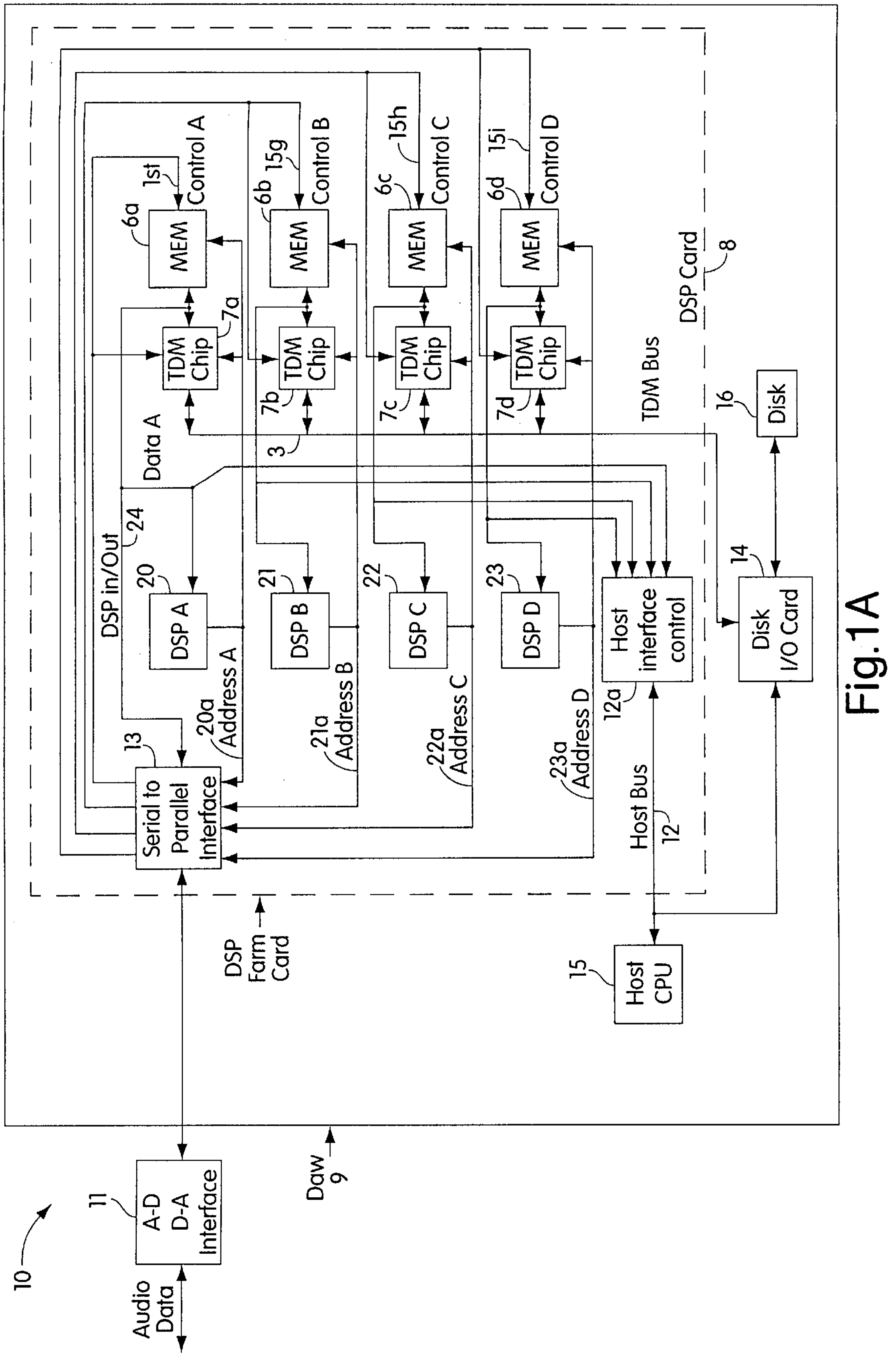
FIG. 1A is a block diagram of one embodiment of a digital audio computing system employing the present invention.

FIG. 1A represents in schematic form one embodiment of a digital audio computing system 10 employing the present invention. The digital audio computing system 10 includes an analog to digital (A/D) converter 11 coupled to a digital audio workstation (DAW) 9. The A/D converter 11 is a tool for integrating external mixers, processors, or tape machines with the editing system of the central processing unit. A variety of A/D converters are provided in the market, any of which may be used with the present invention. In one embodiment of the invention the A/D interface may be, for example, the 888 I/O audio interface manufactured by DIGIDESIGN, Inc., Avid Audio division, Avid Technologies, Tewksbury, Mass. The 888 I/O audio interface provides eight channels of high quality A/D, D/A and digital I/O conversion.

The DAW 9 includes a host central processing unit (CPU) or computer 15, which manages the overall functions of the DAW. The host CPU 15 may be, for example, an Apple Macintosh personal computer that includes a display screen, a central processing unit, dynamic and fixed storage for storing data and instructions, and one or more input devices, such as a keyboard and a mouse. Coupled to the host CPU 15 is a host bus 12, which may be the Peripheral Computer Interconnect (PCI) bus or other interconnects known in the art. Attached to the host bus 12, either internally or externally of the computer cabinet, are a number of plug-in cards, such as a disk input/output card 14 which has attached to it one or more disks 16. Also coupled to the host bus 12 in this embodiment is a DSP card 8.

The DSP card 8 includes one or more digital signal processors (DSPs), for example DSPA 20, DSPB 21, DSPC 22 and DSPD 23, that perform various editing, mixing and audio production functions. The DSP card 8 includes a serial to parallel interface 13. The serial to parallel interface 13 is, in one embodiment, a dynamically programmable custom ASIC that converts the serial digitized audio data stream received from the A/D interface 11 into a parallel stream of digital data for processing by coupled digital signal processors 20–23. Multi-bit audio data is transferred in parallel on a bi-directional DSP IN/OUT bus 24 between the serial to parallel interface 13 and DSP 20. In one embodiment of the invention, the ASIC is a custom designed ASIC formed from a 120 pin Thin Quad Flat Pack (TQFP), and designed by DIGIDESIGN, Inc., and manufactured by ATMEL Corporation, San Jose, Calif. Because the serial to parallel interface 13 is a custom designed ASIC, it utilizes less space than discrete components, more logic may be included within the ASIC to support an increased number of input/output (I/O) channels. By supporting more I/O channels at the DAW, the overall performance of the DAW is enhanced.

As mentioned above, the ASIC is programmable. In one embodiment, the interface between the ASIC and the coupled digital signal processing unit is implemented like a static random access memory (SRAM) interface, where registers are addressed for reading and writing by the digital signal processor. Other types of interfaces, including those where the ASIC is accessed using an interface similar to a dynamic random access memory (DRAM) or a synchronous SRAM may alternatively be used.

The DSP card 8, as well as other cards, may be connected to one another by a ribbon cable which forms part of a time-division multiplexing (TDM) bus 3. For example, in the embodiment of FIG. 1A, the TDM bus couples memory within the DSP card 8 to the disk 16 via the disk I/O card 14. Associated with each DSP 20–23 is a memory 6*a*–6*d*, respectively. The memories 6*a*–6*d* each interface with the TDM bus 3 via respective TDM interface chips 7*a*–7*d*. Using the TDM bus, data from the disk 16 may be forwarded to the respective memory devices 6*a*–6*d* for processing by the associated DSP 20–23.

The TDM bus 3 was originally developed at Bell Laboratories in the 1940s for the transmission of many channels of information over telephone lines. In TDM, multiple channels of audio or digital information are transmitted sequentially. The signals to be multiplexed are sampled at a uniform rate. This uniform rate is known as a frame rate or system sample rate. Each frame is subdivided in time in to as many "time slots" as there are signals that can be transmitted. At the start of system sample, the first signal is transmitted during the first time slot, then the second signal is transmitted during the second time slot, and so on until all the signals have been transmitted. At the start of the next system sample period, the process starts over with the next set of samples from the signals to be transmitted.

The Digidesign TDM bus architecture developed by the assignee of the present invention was developed as a 24-bit wide, 256-time slot protocol that can route digital/audio from any one source to any number of destinations. The sources and destinations include the inputs and outputs of a hard disk-based digital audio recorder/player, the inputs and outputs of external hardware (digital interfaces and analog convertors such as the A/D interface 11), internal audio sources (sample player and synthesizer cards), and DSP processors which run on either algorithm-specific cards or general-purpose DSP cards. In order to transmit 256 digital audio signals in real-time, each audio signal is given a time slot of somewhat less than 1/256th of a system sample period and is then time-multiplexed. The resulting signal is transmitted via a small ribbon cable, shown as TDM bus 3, connecting the various TDM chips together inside the host computer. Each time slot is less than 1/256 of the system sample period to allow for variable-speed DAW applications. The TDM thus provides a communication link between the DSP card and external storage, although other methods may alternatively be used and thus the use of a TDM is not a limitation of the present invention.

The serial to parallel interface 13 of the present invention collects the serial digital audio input data stream received from the A/D converter 11 into twenty-four bit segments for transmission over the DSP IN/OUT bus 24 to DSPA 20. The serial to parallel interface 13 is also coupled to DSPs 20, 21, 22 and 23 via address lines 20*a*, 21*a*, 22*a* and 23*a* respectively, and control lines 15*f*, 15*g*, 15*h* and 15*i*, respectively. As will be described below, the address and control lines allow the serial to parallel interface to control devices (such as memory) coupled to each of the DSPs.

Figure 1B:
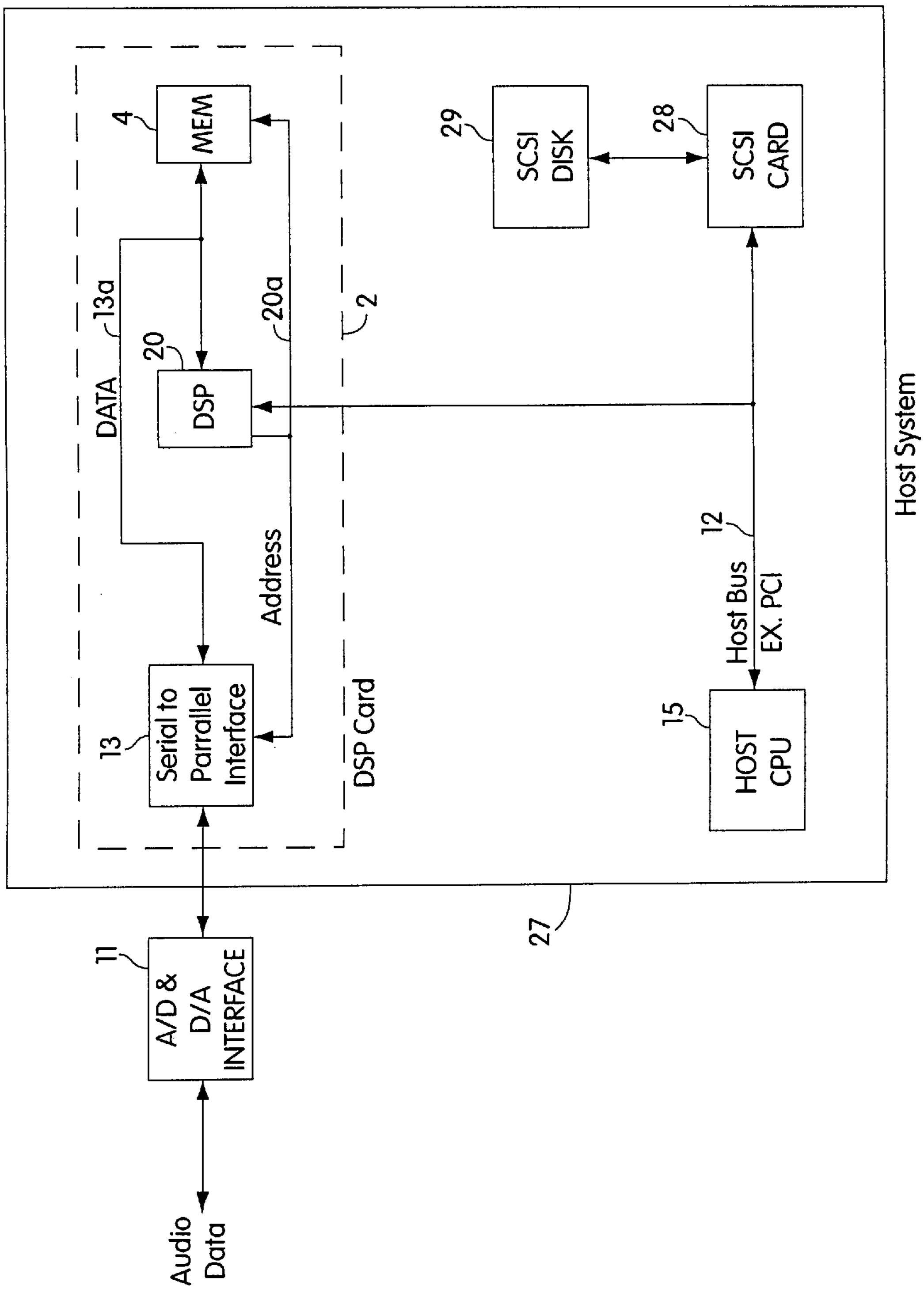
FIG. 1B is a block diagram of a second embodiment of a digital audio computing system employing the present invention.

Referring now to FIG. 1B, a second embodiment of digital audio computing system employing the serial to parallel interface 13 of the present invention is shown to include the A/D converter 11 coupled to a digital audio workstation 27. The digital to audio workstation 27 includes a DSP card 2 that includes a serial to parallel interface 13, coupled to a digital signal processor 20 and a memory device 4 via a data bus 13*a*. The DSP 20 forwards address information to the serial to parallel interface and the memory device 4 via bus 20*a*. As in the above embodiment, the serial to parallel interface 13 translates serial audio data, received from the A/D interface 11, into a parallel bitstream for processing by the DSP 20, and also translates parallel audio data, received from the DSP 20, into serial audio data for transmission to the A/D interface 11.

In the embodiment of FIG. 1B, rather than using a TDM bus for transferring data, the DSP 20 is coupled directly to the host PCI bus 12. The host PCI bus 12 is also coupled to a Small Computer System Interconnect (SCSI) card 28, which transfers data from a SCSI disk device 29 to the PCI bus for processing by either the DSP 20 or the host CPU 15. The embodiment of FIG. 1B thus illustrates a digital audio computing system wherein the DSP card is coupled directly to the host CPU 15 using the host bus 12.

Figure 1C:
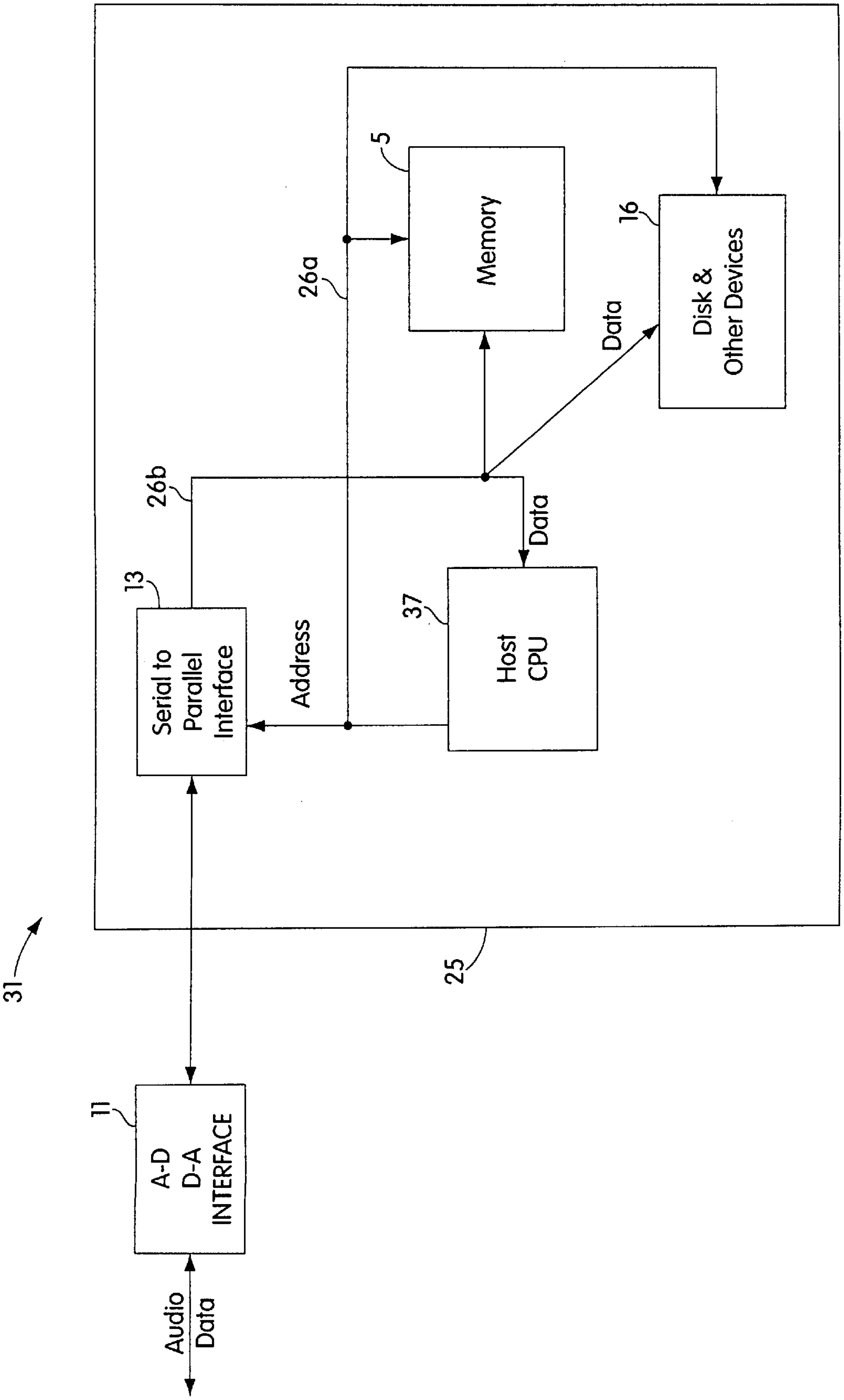
FIG. 1C is a block diagram of a third embodiment of a digital audio computing system employing the present invention.

Referring now to FIG. 1C, a third embodiment of a digital audio computing system 31 employing the serial to parallel interface 13 of the present invention includes a DAW 25 having a serial to parallel interface 13 coupled directly to a host central processing unit 37 via a host memory bus including a data bus 26*b* and an address bus 26*a*. In the embodiment of FIG. 1C, the host CPU 37 is capable of performing DSP functions. Data from the serial to parallel interface 13 may be forwarded either to the memory 5, the host CPU 37 or alternatively to the disk 16 and other devices via the data bus 26*b*. Address information for controlling the serial to parallel interface 13, memory 5 and disk 16 is forwarded by the host CPU 37 on address bus 26*a*. As in the two above embodiments, the serial to parallel interface 13 is used to translate serial audio data, received from the A/D interface 11 into a parallel, multi-bit data stream for processing or storage by the devices attached to data bus 26*b*. The serial to parallel interface 37 is also used to translate parallel multi-bit audio data received from either the host CPU, memory 5 or disk 16 into a serial stream of audio data for transmission to the A/D converter 11.

Accordingly, as shown in the embodiments of FIG. 1A, FIG. 1B and FIG. 1C, the serial to parallel interface 13 may either be included directly on a DSP processor card or alternatively may be provided on the host processing board. The use of the serial to parallel interface is not limited to interfacing with only a DSP, but may be used to interface any processor having digital signal processing capabilities to a serial audio input/output data stream.

As will be described in more detail below, the serial to parallel interface 13 of the present invention provides a number of advantages over the prior art, hardwired interface method. First, the serial to parallel interface is capable of receiving serialized input data in a variety of different audio formats, including $I^2S$ format (for audio components manufactured by Philips Corporation) or SSI format (for audio components manufactured by Motorola corporation) and to receive audio data having different bit width formats. Because the serial to parallel interface is capable of handling audio data received in a variety of formats, the DAW may be used to support a variety of audio devices without having to include specialized hardware to support each various device. A second advantage of the serial to parallel interface 13 is that it is also able to easily accommodate serial audio data that is received at different frequencies. As a result, the serial to parallel interface may flexibly accommodate different components that operate at different frequencies without any alterations to the design. A third advantage of the serial to parallel interface 13 is that its architecture guarantees that erroneous data is not propagated to the DSPs, thereby maintaining an overall audio data consistency and facilitating error correction and handling in the DAW. How the serial to parallel interface 13 operates to achieve these results are described in more detail below.

Figure 2:
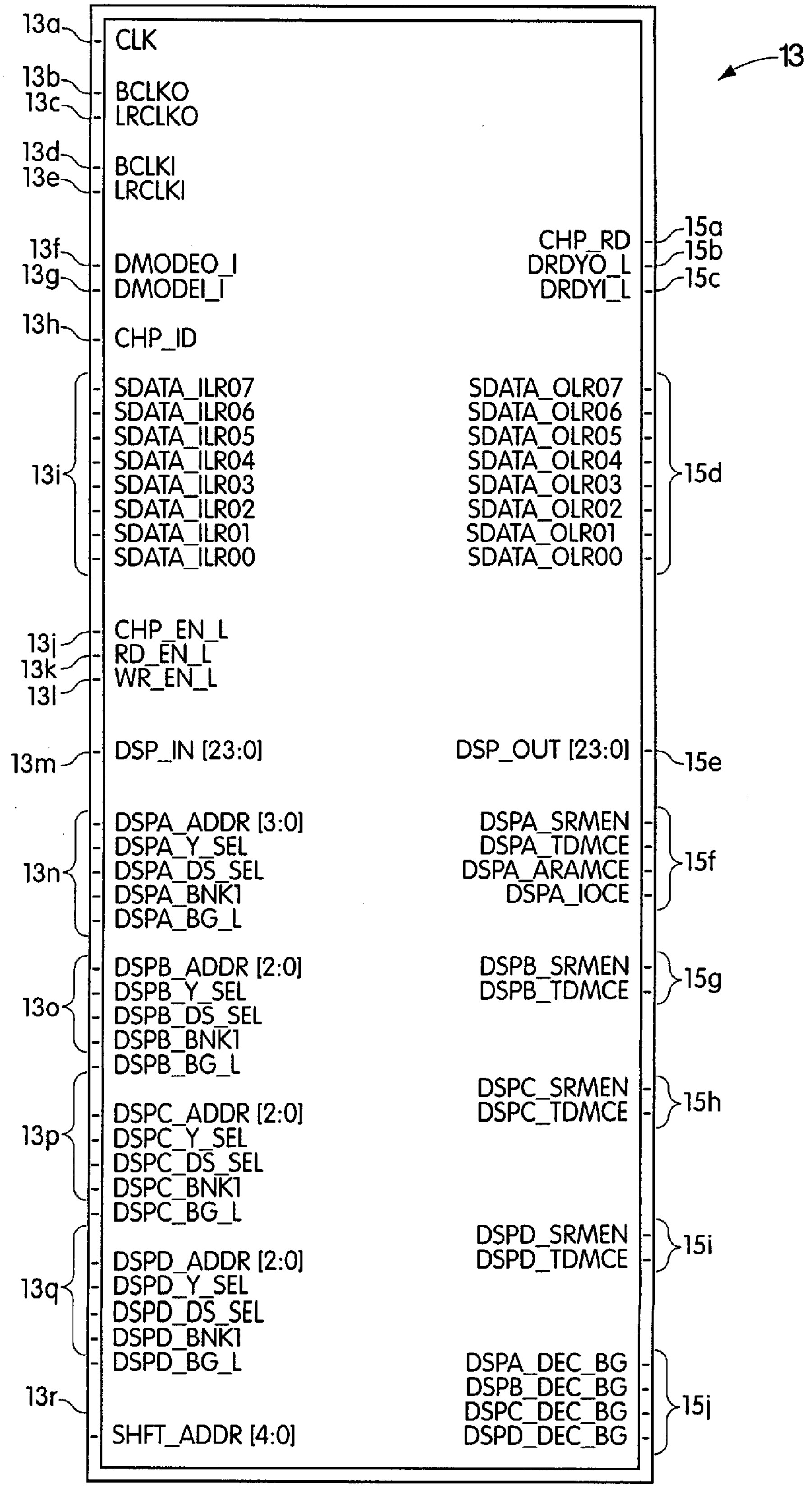
FIG. 2 is a block diagram illustrating the interface signals of a serial to parallel interface of the present invention for use in the digital audio workstation of FIG. 1A, 1B or 1C.

Referring now to FIG. 2, a top level block diagram of the serial to parallel interface 13 is provided for the purposes of describing the various signals that are input and output from the interface. In general, signal names including the suffix "I" are input signals, while signal names including the suffix "O" are output signals. In addition, the terminology of "asserted" will be used herein to indicate an enabled state of an associated signal, rather than indicating a specific voltage level of the signal. Test and reset signals are not shown or described herein.

The main data paths into and out of the serial to parallel interface are the SDATA_ILR[0:7] signals 13*i*, the SDATA_OLR[7:0] signals 15*d*, the DSP_IN[23:0] signals 13*m* and the DSP_OUT[23:0] signals 15*e*. The SDATA_ILR[7:0] signals comprise eight serial input lines, one for each of eight stereo channels, thereby allowing the serial to parallel interface to process up to sixteen channels of digital audio data. The SDATA_OLR[7:0] comprise eight serial output lines, one for each of the eight stereo channels. Although the SDATA_ILR and SDATA_OLR signals have been shown as individual signal lines, it should be understood that the present invention may be easily modified by one of skill in the art to support the use of bi-directional signals on the serial input/output data paths. Similarly, the DSP_IN and DSP_OUT signals each comprise twenty-four bits and form the interface between the serial to parallel interface 13 and the processor performing digital signal processing (whether it be the DSPs of FIG. 1A or the host CPU of FIG. 1B). The twenty-four bit signals may also be provided either as discrete datapaths or as a bi-directional datapath.

The remaining signals that are input into and output from the serial to parallel interface perform the functions of clocking the serial to parallel interface, providing datapaths for programming the serial to parallel interface, and identifying audio data formats as well as defining other aspects of the chip.

The signals CLK 13*a*, BCLKI 13*d* and LRCLKI 13*e* are input clocking signals received by the serial to parallel interface. The CLK 13*a* signal is forwarded from the host CPU 15, and is the master clock for all the logic on the chip. The BCLKI 13*d* is the sample bit clock, provided from logic external to the DAW that synchronizes all of the audio components coupled to the DAW. There is one sample bit clock cycle for each bit of an audio sample received from the A/D converter 11. The LRCLKI signal is a left/right clock, provided from the A/D interface, that is used to indicate whether the audio data received on the serial input line is the left or right channel of the stereo input. In one embodiment, the BCLKI frequency is equal to sixty-four times the frequency of the LRCLK, although this is not a limitation of the invention.

The signals BCLKO 13*b* and LRCLKO 13*c* are clock signals output from the serial to parallel interface 13. The BCLKO signal is the clocking signal for clocking serial audio data out of the serial to parallel interface to the A/D converter. As will be described in more detail below, the BCLKO signal is controlled internally to the serial to parallel interface such that it may be disabled to preclude a shifting out of incomplete data from the serial to parallel interface. There is one BCLKO clock cycle for each bit of digital audio data provided by the interface. The LRCLKO signal is a left/right clock used to indicate whether the audio data forwarded out on the serial output line is the left or right channel of the stereo input.

The signal DMODEO_I signal 13*f* is used to identify the format ($I^2$s or SSI) of the data forwarded out of the serial parallel interface on the serial output datapath SDATA_OLR. If the pin is low at reset of the serial to parallel interface, the format defaults to SSI. The mode may be changed by writing a predetermined value to an I2S_Out bit of a Shift Control Register (SCR) to be described later herein.

The signal DMODEI_I signal 13*g* is used to identify the format ($I^2$s or SSI) of the data received by the serial parallel interface on the serial input datapath SDATA_ILR. If the pin is low at reset of the serial to parallel interface, the format defaults to SSI. As with the DMODEO_I signal, the mode may be changed by writing a 1 or a 0 to an I2S_In bit of a Shift Control Register (SCR) to be described later herein.

The signal CHP_ID 13*h* is used to provide an identifier for the serial to parallel interface. In one embodiment of a DAW, there may be two serial to parallel interface chips coupled to each DSP (thus allowing up to thirty-two different audio channels to be input to the DSP). The CHP_ID signal allows two serial to parallel interface chips to be coupled to the same DSP without confusion. At reset, the status of the signal identifies the serial to parallel interface and selects one of two address ranges for configuration and audio data.

The CHP_EN, RD_EN and WR_EN signals 13*j*, 13*k* and 13*l*, respectively, are used to control the reading and writing of data to the serial to parallel interface. In one embodiment, in order for a read or a write to occur, the CHP_EN must be asserted with assertion of the RD_EN or WR_EN signal.

As described above, in one embodiment there may be up to four DSPs addressed by the serial to parallel interface. The groups of signals 13*n*, 13*o*, 13*p* and 13*q* each include common groups of signals which are dedicated to different ones of the four DSPs. As such, only functions of the signals in group 13*n* will be described. The signals DSPA_ADDR [3:0], DSPA_Y_SEL, DSPA_DS_SEL and DSP_BNK1 are used to identify memory ranges and to control reads and writes for the device connected to the respective DSP device. The DSPA_BG signal is used to disable DSPA output enables, to prevent the DSPA and any devices coupled to the DSPA from driving data on the DSP IN/OUT bus.

The SHFT_ADDR[4:0] signals 13*r* are used to provide an index to the Shift Control Register (SCR) and other input/output (I/O) registers of the serial to parallel interface. The I/O registers utilize sixteen addresses, while the SCR uses the remaining sixteen addresses.

The DRDY_O signal 15*b* is an output interrupt that is used to indicate to the DSP that it the DSP may write twenty-four bits of data to the serial to parallel interface. As will be described in more detail below, the signal is generated once per sample period, approximately three bit clocks after the LRCLKO indicates left sample data.

The DRDY_I signal 15*c* is an output interrupt used to indicate to the DSP that data is ready to be read from the parallel output port (DSP_OUT) of the serial to parallel interface. As with the DRDY_O signal, the DRDY_I signal is generated once per sample period, approximately three clocks after the LRCLKO indicates left sample data. The operation of the DRDY_O and DRDY_I signals will be described more fully with reference to timing diagrams later herein.

The groups of signals 15*f*, 15*g*, 15*h* and 15*i* each include common groups of enable signals that are dedicated to controlling different ones of the four DSPs. As such, only functions of the signals in group 15*f* will be described. The signal DSPA_SRMCE is a chip enable signal for the coupled DSP A. The signal DSPA_TDMCE is a TDM chip enable for DSP A. The signal DSPA_IOCE is an I/O chip enable for DSP A. The signal DSPA_ARAMCE is a DRAM Audio buffer chip enable for the attached DSPA.

Figure 3:
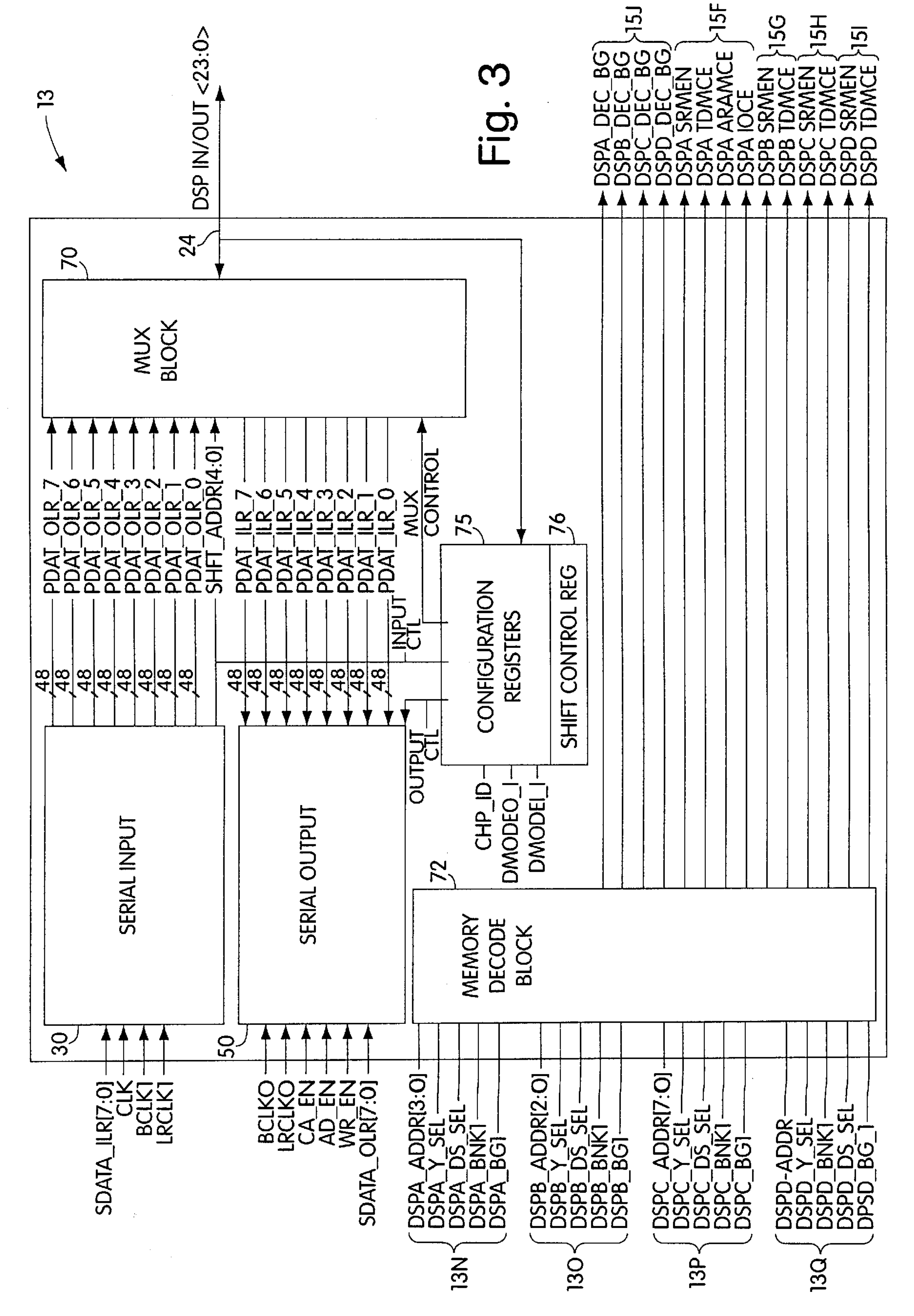
FIG. 3 is a block diagram of one embodiment of the serial to parallel interface of FIG. 2.

Referring now to FIG. 3, a block diagram of one embodiment of the serial to parallel interface 13 is shown. References below to the operation of the serial to parallel interface 13 refer to the interface between the serial to parallel interface 13 and a coupled DSP. However, it should be understood that the operation is the same whether the digital signal processing device attached to the serial to parallel interface is a DSP or a processor performing digital signal processing functions. Accordingly, the below description does not limit the invention to use with DSPs, but is extended to provide an interface to any processing unit capable of performing signal processing functions.

In FIG. 3, the serial to parallel interface is shown to include a serial input block 30 coupled to receive the SDATA_ILR signals from each of the eight channels from the A/D converter. The serial to parallel interface 13 also includes a serial output block 50, coupled to forward data over the SDATA_OLR signals to coupled A/D devices or the like for each of the eight channels. A multiplexer (MUX) block 70 is coupled to the serial input block 30 and the serial output block 50. The MUX block 70 provides an interface between the coupled digital signal processors via the DSP IN/OUT bus and the serial input and output blocks 30 and 50 respectively. Data is passed in parallel format from the serial input block via the MUX block to a DSP. Data is also passed in parallel format from the DSPs to the serial output block 50 via the MUX block 70. In FIG. 3, each channel (for example, PDAT_OLR_7) is shown to include forty-eight bits of stereo data, including twenty-four bits for the left channel audio and twenty-four bits for the right channel audio. The datapath on the DSP IN/OUT bus comprises twenty-four bits. Accordingly, the MUX block forwards either left or right channel audio data to the DSP in any given transmission interval.

The serial to parallel interface also includes a memory decode block 72. The memory decode block 72 is used for controlling the interfaces between the attached DSPs and the serial to parallel interface. Accordingly, the memory decode block receives, for each of the coupled DSPs, address and memory write control information on lines 13*n*–13*q*. Using this information, the serial to parallel interface provides enable and control signals to the devices coupled to the respective DSPs via signals 15*f*–15*j*.

The serial to parallel interface additionally includes a block of configuration registers 75. The configuration registers are used to configure the address decode for the serial to parallel interface along with providing base addresses for decode and compare operations. The configuration registers are read and written by the attached DSP (FIG. 1) using the parallel DSP IN/OUT bus that couples the DSP to the serial to parallel interface.

One of the configuration registers is the Shift Control Register (SCR) 76. The contents and organization of the SCR 76 is shown below in Table I:

TABLE I

| CHP_ID | I2S_In | I2S_Out | BMODEO2:0 | BMODEI2:0 |
|---|---|---|---|---|

The CHP_ID bit is used to identify the serial to parallel interface, for example when there is more than one interface in the DAW. Although only one bit is shown above, additional bits could be added as more serial to parallel interfaces are provided.

The I2S_In bit controls the serial input data format. The I2S_In bit is set during reset from the DMODEI_I 13*g* (FIG. 2) pin on the interface. The bit can be overwritten after reset to change the input serial data format between $I^2S$ or SSI. To support other audio formats, the bit width of the I2S_In field could be expanded to provide numerous encodings corresponding to the desired formats.

The I2S_Out bit controls the serial output data format. The I2S_Out bit is set during reset from the DMODEO_I 13*f* (FIG. 2) pin of the serial to parallel interface. The I2S_Out bit can be written after reset to change the output serial data format between $I^2S$ or SSI. As with the I2S_In field, if it is desired to support other audio formats, the bit width of the I2S_Out field could be expanded to provide numerous encodings corresponding to the desired formats.

The BMODEO2:0 bits are used to control the serial output word width. Although the bus width has been described above as comprising twenty-four bits, the serial output word width is variable between sixteen and twenty-four bits. The serial output word width may be changed at any time during operation. When the serial output word width is less than twenty-four bits, the low order bits of the twenty-four bit parallel DSP interface that do not include bits associated with the word are forced to zero.

The BMODEI2:0 bits are used to control the serial input word width. Like the serial output word width, the serial input word width is variable from sixteen to twenty-four bits, and may be changed at any time during operation by writing the SCR 76.

At power on of the DAW, the SCR is initialized to default values. For example, the BMODEI2:0 an BMODEO2:0 bits are initialized to 1110 (hexidecimal). The I2S_In and I2S_Out bits are initialized in response to the state of the DMODEI 13*g* and DMODE0 13*f* pins. The CHP_ID bit is initialized in response to the CHP_ID pin 13*h*. These default values may be used during operation of the DAW, or alternatively may be modified prior to or during operation of the DAW.

Accordingly, the SCR register provides a means for modifying the audio data format and the audio word width format prior to or during operation. By providing a programmable configuration register, one serial to parallel interface may be used interchangeably with a variety of different devices that operate in different formats. In addition, as will be described in more detail below, because the clocking structure used internally to the serial to parallel interface is controlled by state machines, the serial to parallel interface may easily alternate between any range of input audio frequencies.

Figure 4:
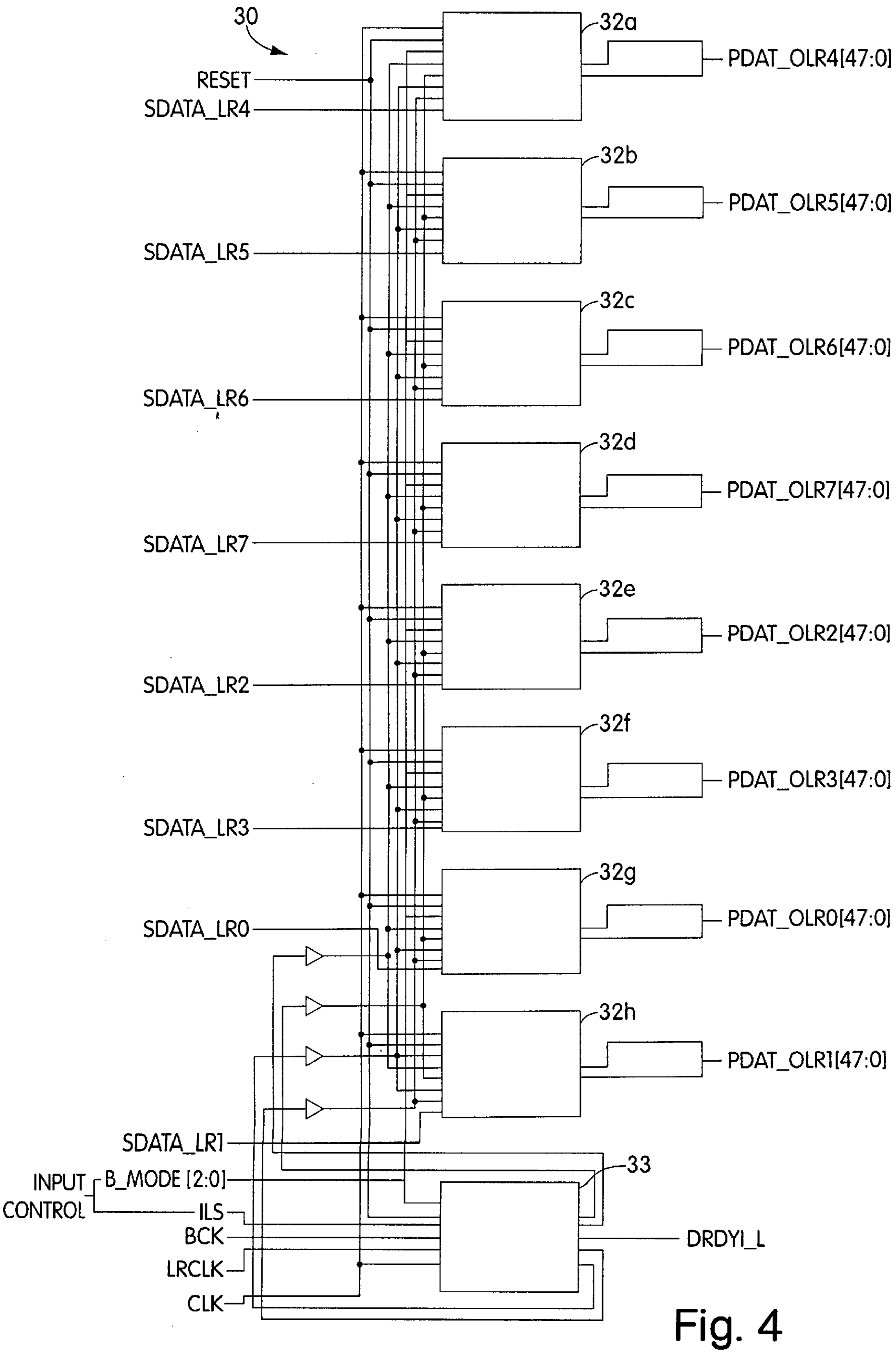
FIG. 4 is a block diagram of an input serial datapath of the serial to parallel interface of FIG. 3 for multiple channels.

Referring now to FIG. 4, a block diagram of the serial input block 30 of the serial to parallel interface 13 is shown including eight separate datapath blocks 32*a*–32*h* to support each of the eight different channels received respectively on serial data lines SDATA_LR0–SDATA_LR7. Each of the datapath blocks 32*a*–32*h* are controlled by an input state machine 33. The serial input state machine receives input control signals from the configuration registers, including the BMODEI2:0 bits and the I2S_IN bits from the SCR. The input state machine 33 additionally receives the BCLKI, CLK and LRCLKI serial to parallel interface inputs.

Using the received information, the input state machine 33 controls the writing of serial audio data on each of the channels into an associated one of the data blocks 32*a*–32*h*. The control signals provided by the input state machine 33 include the following signals: an ISHIFT signal, an LBUFLD signal, a RBUFLD signal, a DBUFLD signal and a DRDY_I signal. As will be described in more detail later herein, the LBUFLD, RBUFLD and DBUFLD signals are used to load associated buffers within each of the data blocks 32*a*–32*h*. The DRDY_I signal is an interrupt signal that is forwarded to the attached DSPs to signal the DSPs that the serial to parallel interface 13 has data ready for transfer.

The ISHIFT signal is used as the main clocking signal for the serial input datapath. Because the ISHIFT signal is generated by the input state machine based on the input CLK, BCLKI and LRCLKI signals, the datapath logic operates at whatever input clock frequency is provided. By using state machine control logic that is controlled by the external clock frequency (in contrast to using hardwired control) the signals that are used to control the datapath are correctly controlled regardless of the frequency of the input clocking signal. Accordingly, as well as being able to support a variety of audio data formats and bit width formats, the serial to parallel interface is capable of receiving audio data at a variety of different frequencies, thereby providing a flexible and versatile interface to the DAW.

Figure 5:
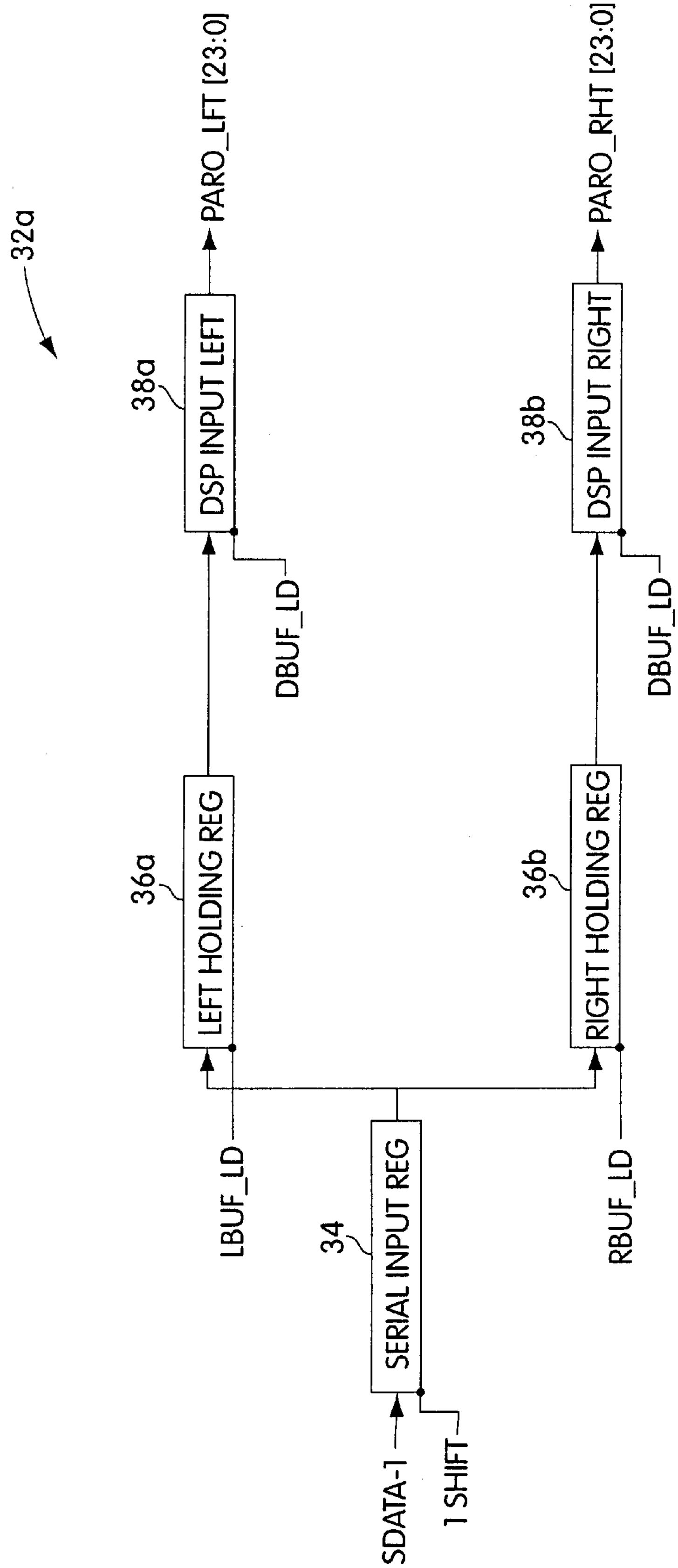
FIG. 5 is a block diagram of the logic implemented in the input serial data path of FIG. 4 for each channel.

Referring now to FIG. 5, a block diagram of one of the serial input datapath blocks 32*a* is shown. All of the serial input datapath blocks 32*a*–32*h* are substantially identical, and therefore only one will be described in detail. In FIG. 5, the serial input datapath block is shown including a serial input register 34 coupled to a left holding register 36*a* and a right holding register 36*b*. Coupled to the left holding register 36*a* is a DSP input left register 38*a*. Coupled to the right holding register 36*a* is a DSP input right register 38*a*. Because the datapath includes both the holding registers 36*a* and 36*b*, and the DSP input registers 38*a* and 38*b* it is said to be a double buffered datapath.

The use of a double buffered architecture provides several advantages in the serial to parallel interface. By providing a double buffered architecture, the DSP may retrieve the data at any point within the sample period, except for approximately the first three bit clocks of the sample period, during which time the serial to parallel interface is moving data between internal registers. Providing a double buffered datapath in the input serial datapath block thus eases the timing constraints for transferring data between the serial to parallel interface and the DSP.

In addition, the use of a double buffered datapath precludes propagation of erroneous data to the DSP. Erroneous data may occur at the serial to parallel interface when there is a problem with the external sample clock (BCLKI) such that an insufficient number of bits are received during a given sample period. In prior art designs, typically the incomplete data was moved directly to registers that were accessible to the DSP. As a result, the DSP could potentially input erroneous data. However, by using a double buffered arrangement such as that shown in FIG. 5, the DSP registers 38*a* and 38*b* are effectively isolated from the serial input datapath. Data is only moved from the holding registers to the DSP when the input state machine verifies that a full sample has been received at the serial shift registers. As such, the double buffered system guarantees that erroneous data, incurred as a result of the receipt of an incomplete sample, will not propagate to the DSPs. Accordingly, the double buffered arrangement provides a mechanism for isolating errors before they propagate further through the DAW system.

The LBUF_LD, RBUF_LD, and DBUF_LD signals, received from the input state machine 33 (FIG. 4) as described above, operate as follows: The LBUF_LD signal is used to load the left holding register 36*a* with data from the serial input register; the RBUF_LD signal is used to load the right holding register 36*b* with data from the serial input register; and the DBUF_LD signal is used to load data from both of the holding registers 36*a* and 36*b* into the coupled DSP input register 38*a* and 38*b*, respectively.

Figure 6:
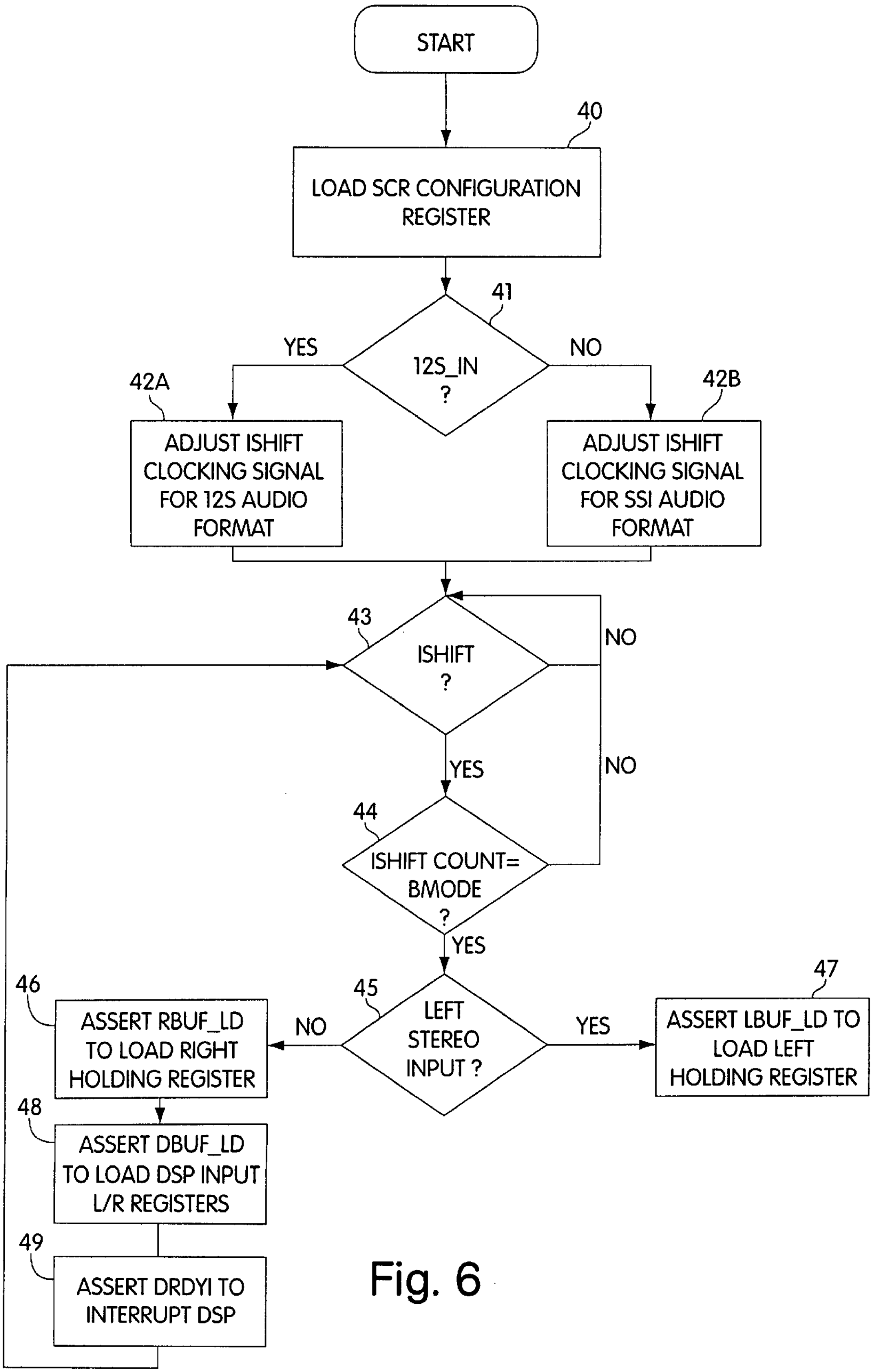
FIG. 6 is a flow diagram illustrating the flow of data through the input serial datapath of FIG. 5.
Figure 7:
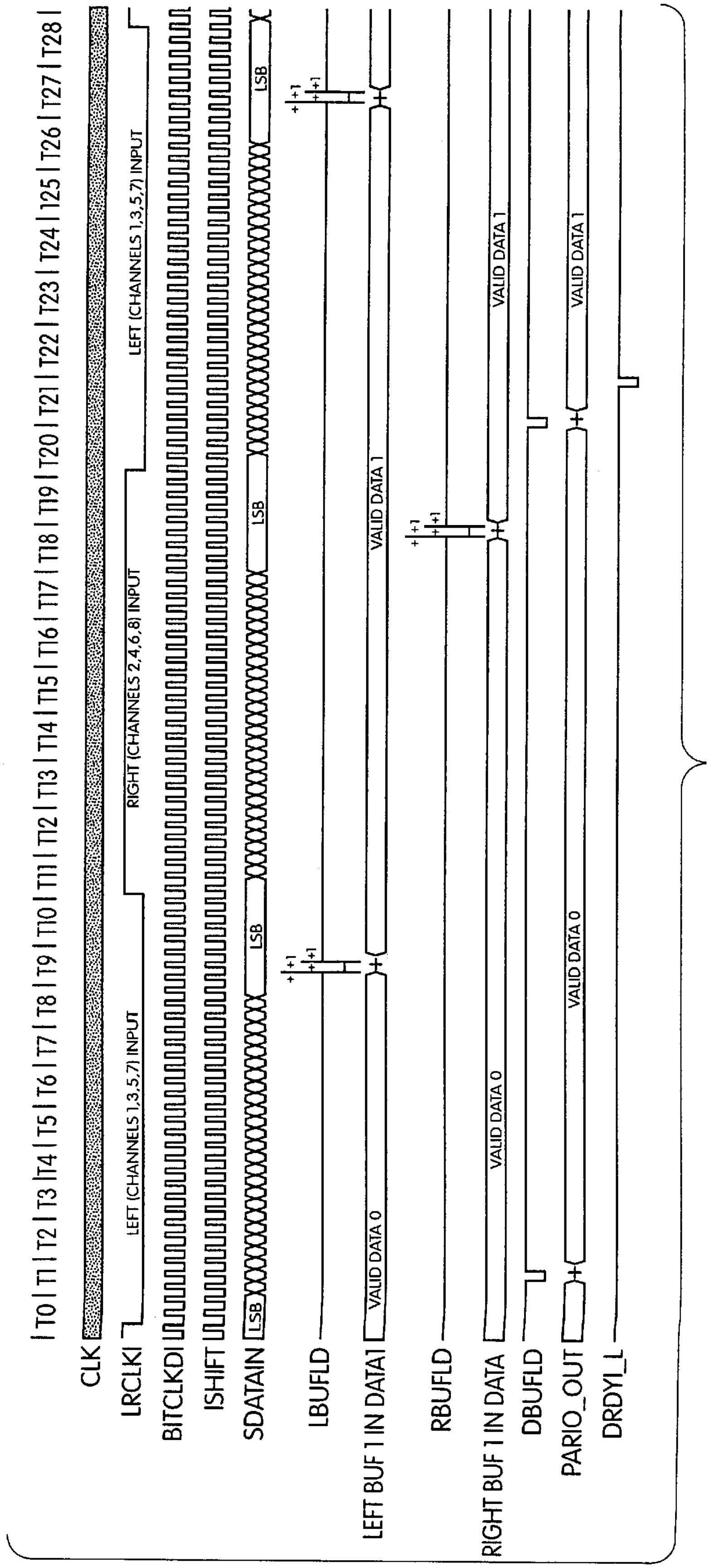
FIG. 7 is a timing diagram illustrating the flow of data through the input serial datapath of FIG. 6.

The method used by the input state machine 33 to control the operation of the serial input datapath block 32*a* will now be described with reference to the flow diagram of FIG. 6. At step 40, the configuration registers are loaded, or optionally the default values of the SCR, determined at power on of the serial to parallel interface are used. As mentioned above, the configuration registers identify the audio data format via the I2S_In field of the SCR and the bit width format via the BMODEI<2:0> field of the SCR of the serial audio input data. At step 41, the I2S_In field is examined to determine the format of the incoming shift data. The control of the ISHIFT signal is modified depending upon the value of the I2S_In field. If the value of the I2S_In field indicates $I^2S$ format, the clocking of the ISHIFT signal is adjusted to received $I^2S$ format audio data. An example of the ISHIFT signal for $I^2S$ format is shown in FIG. 7. In SSI format, the BCLKI signal and LRCLK signal are inverted relative to the $I^2S$ format. Accordingly, if the I2S_In field indicates SSI format, at step 42*b* the ISHIFT signal is modified such that data is shifted in on the falling edges of the BCLKI, rather than the rising edge, and received one bit clock earlier. At step 43, the assertions of the ISHIFT signal, which clocks one bit of serial audio data into the shift register 34 at every cycle, are monitored. When the ISHIFT signal is asserted at step 43, then at step 44 a count of the ISHIFT assertions (maintained by the state machine) is compared against the value indicated in the BMODEI field of the SCR to determine whether the full sample size has been received. If it has not, then the process returns to step 43 to wait for the receipt of the next ISHIFT signal. If the full sample size has been received, then at step 45, it is determined whether the received serial audio data was left channel or right channel data. The determination as to whether it is a left or right stereo channel is indicated by the LRCLKI signal. In general, in a transfer of data between an external device and the DAW, the left channel of stereo audio is received prior to the right channel. If it was left channel stereo data, then right channel stereo still must be received, therefore, at step

47, the LBUF_LD signal is asserted and the contents of the serial input register 34 are shifted into the left holding register 36*a*. The process returns to step 43 to receive the right channel stereo data.

When, at step 45, it is determined that the sample data is right channel stereo, then at step 46 the input state machine asserts the RBUF_LD signal to load the right holding register 36*b* with the contents of the serial input register 34. At this point, both holding registers store both left and right components of one of the channels. Thus, at step 48, the state machine 33 asserts the DBUF_LD signal, to load the respective DSP input registers 38*a* and 38*b* with data from the holding registers 36*a* and 36*b*, respectively. At step 49, once the data has been loaded into the DSP registers, the input state machine 33 asserts the DRDY_I signal to interrupt the DSPs. The DSPs thus have one sample period to retrieve the data from the DSP input registers 38*a* and 38*b* before it is overwritten with the next pair of samples.

Referring now briefly to FIG. 7, a timing diagram illustrating the operation of the input state machine 33 and the resulting flow of data through the input serial datapath block 32*a* is provided. The timing diagram is apportioned into a series of discrete time intervals T0–T28, where each time interval represents approximately three data cycles within the serial to parallel interface.

At time T0, the LRCLKI signal becomes deasserted, indicating that left channel data is to be received at the serial to parallel interface. The ISHIFT signal causes twenty-four bits of data to be shifted into the serial input register 34 (FIG. 5). Once the full sample data has been shifted into the serial input register, at approximately T8 the LBUF_LD is asserted (by bringing the value low), and the left holding register 36*a* is loaded with Valid Data1. The ISHIFT signal continues to pulse, shifting in the right channel data. At approximately time T18, the entire right channel sample is received, and the RBUF_LD signal is asserted (by bringing the value low), thus storing the right channel data in the right holding register 36*a*. During time T20 the DBUF_LD signal is asserted, causing the data in the left and right holding registers 36*a* and 36*b* to be forwarded to the DSP input registers 38*a* and 38*b*, respectively. During time T21, the DRDY_I signal is asserted by the input state machine to cause an interrupt at the associated DSP.

Figure 8:
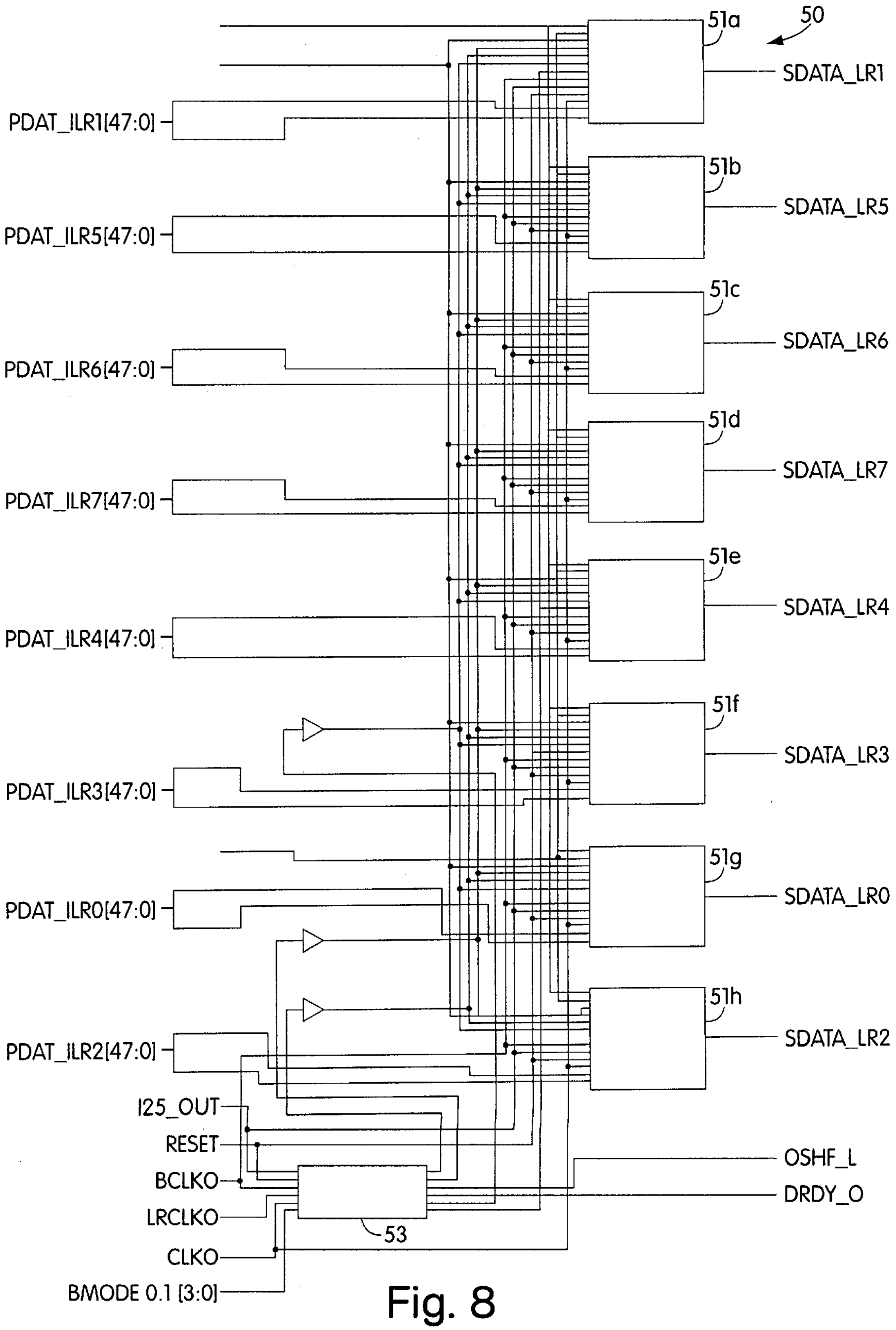
FIG. 8 is a block diagram of an output serial datapath of the serial to parallel interface of FIG. 3 for multiple channels.

Referring now to FIG. 8, a block diagram of the serial output block 30 of the serial to parallel interface 13 is shown including eight separate datapath blocks 51*a*–51*h* for forwarding data on each of the eight different serial lines SDATA_LR0–SDATA_LR7. Each of the datapath blocks 51*a*–51*h* are controlled by an output state machine 53. The output state machine receives control signals from the configuration registers, including the BMODEO2:0 bits and the I2S_Out bits from the SCR. The BMODEO2:0 bits are used to identify the width of the audio sample data that are output on the serial lines SDATA_LRO lines. The I2S_Out bit indicates whether the data is output in $I^2S$ format or SSI format. In $I^2S$ format, data is output on the rising edge of the BCLKO, while in SSI format, the data is output on the falling edge of the BCLKO and is offset by one cycle. In addition, the LRCLKI is inverted between the two formats. The output state machine 53 additionally receives the BCLKO, CLK and LRCLKO signals described above.

Using the received information, the output state machine 53 controls the writing of serial audio data on each of the channels into an associated one of the data blocks 51*a*–51*h*. The control signals provided by the output state machine 53 include the following signals: SHFT_LD, LRLD, OSHF_L, DRDY_O, SHIFTEN and some state bits PSTATE[8:0]. The PSTATE bits decode into the discrete signal LEFT_RIGHT. As will be described in more detail later herein, the SHFT_LD, LRLD, DRDY_O, SHIFTEN and LEFT_RIGHT signals are used to load associated buffers within each of the serial output datapath blocks 51*a*–51*h*. Other signals that are received used by the serial output datapath blocks include a RHT_SEL[7:0] and a LFT_SEL[7:0] signal, that are forwarded from the DSP and select one of the registers (either right or left) for writing at each of the output datapath blocks. As will be described in more detail below, the DRDY_O signal is an interrupt signal that is forwarded to the attached DSPs to signal the DSPs that the serial to parallel interface 13 has data ready for transfer.

Figure 9:
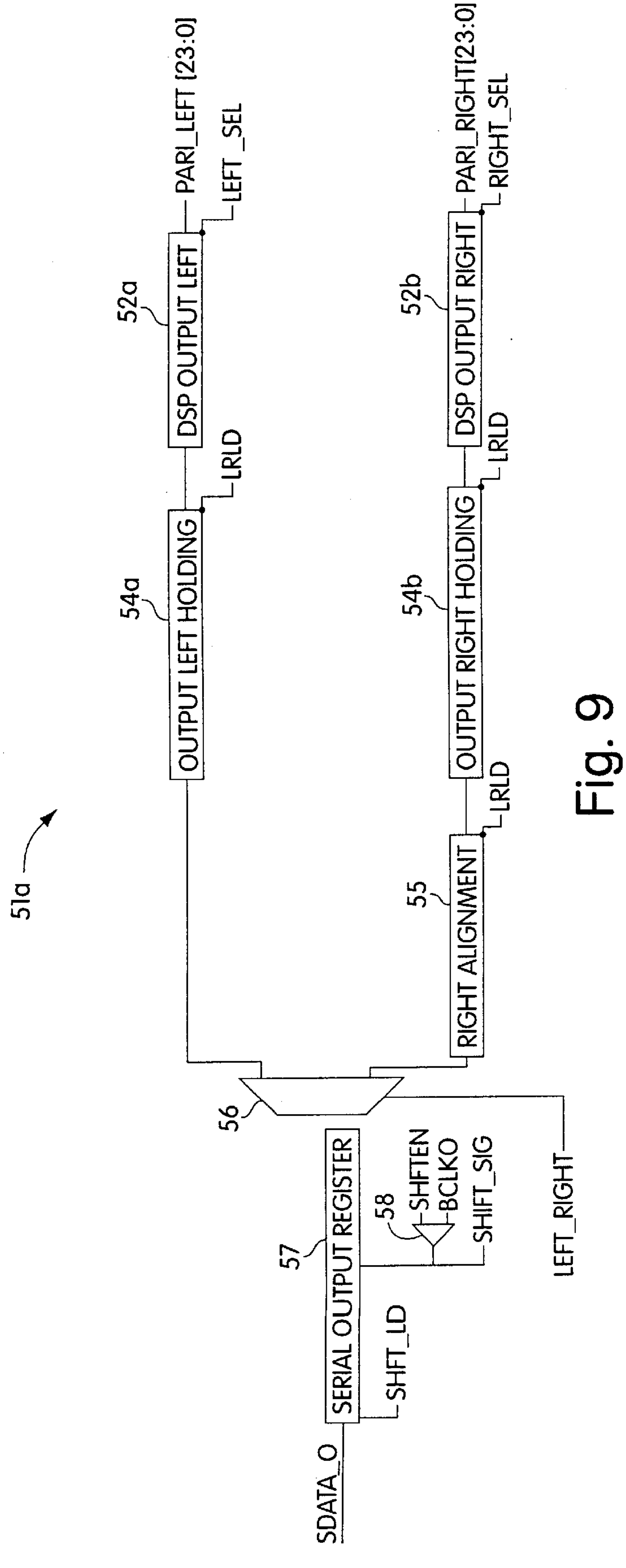
FIG. 9 is a block diagram of the logic implemented in the output serial data path of FIG. 8 for each channel.

Referring now to FIG. 9, a block diagram of one of the serial output datapath blocks 51*a* is shown. All of the serial output datapath blocks 51*a*–51*h* are substantially identical, and therefore only one will be described in detail. In FIG. 9, the serial output datapath block is shown including a pair of DSP output registers 52*a* and 52*b*, coupled to output left and right holding registers 54*a* and 54*b*, respectively. The output right holding register 54*b* is further coupled to a right alignment register 55. The right alignment register is provided because of the order at which data is forwarded from the serial output datapath block 51; because the left channel is forwarded first, the right alignment register stores right channel data to allow for data from the DSP input registers to be moved into the holding registers 54*a* and 54*b* without overwriting the right channel data.

The right alignment register 55 and the output holding registers 54*a* and 54*b* are loaded by an assertion of the LRLD signal received from the output state machine 53. The DSP output registers 52*a* and 52*b* are loaded in response to the LEFT_SEL and RIGHT_SEL signals. Because the DSP IN/OUT data bus comprises only twenty-four bits, the LEFT_SEL and RIGHT_SEL signals identify the destination channel of the twenty-four bit audio data received from the DSP during the given transfer cycle.

The serial output register 57 is coupled to a multiplexer 56 to receive data from either the right alignment register 55 or the output left holding register 54*a*, responsive to the value of the left/right select line received from the output state machine 53. The serial output register 57 receives two inputs; a first input, driven by the signal SHIFT_LOAD, controls the loading of the serial output register 57, while a second signal SHIFT_SIG controls the shifting out of serial data from the serial output register 57, where one data bit is shifted out for each assertion of the SHIFT_SIG. The SHIFT_SIG is a gated clock signal output from AND gate 58. The inputs to AND gate 58 include the BCLKO signal and the SHFTEN signal. The BCLKO signal is the sample output clock, while the SHFTEN signal is an enable signal provided by the output state machine 53. The SHFTEN signal is used to preclude the shifting out of data from the serial output register 57 when it is being loaded, and to align the shifting out with a sample period.

Similar to the input serial datapath, the output serial datapath is a double-buffered architecture. By providing a double buffered architecture in the output path, the DSP may forward data at any point within the sample period (except for approximately the first three bit clocks of the sample period during which time the serial to parallel interface is moving data between internal registers) for storage in the DSP registers 52*a* and 52*b*. Providing a double buffered datapath in the output serial datapath block thus eases the timing constraints for transferring data between the DSP and the serial to parallel interface.

Figure 10:
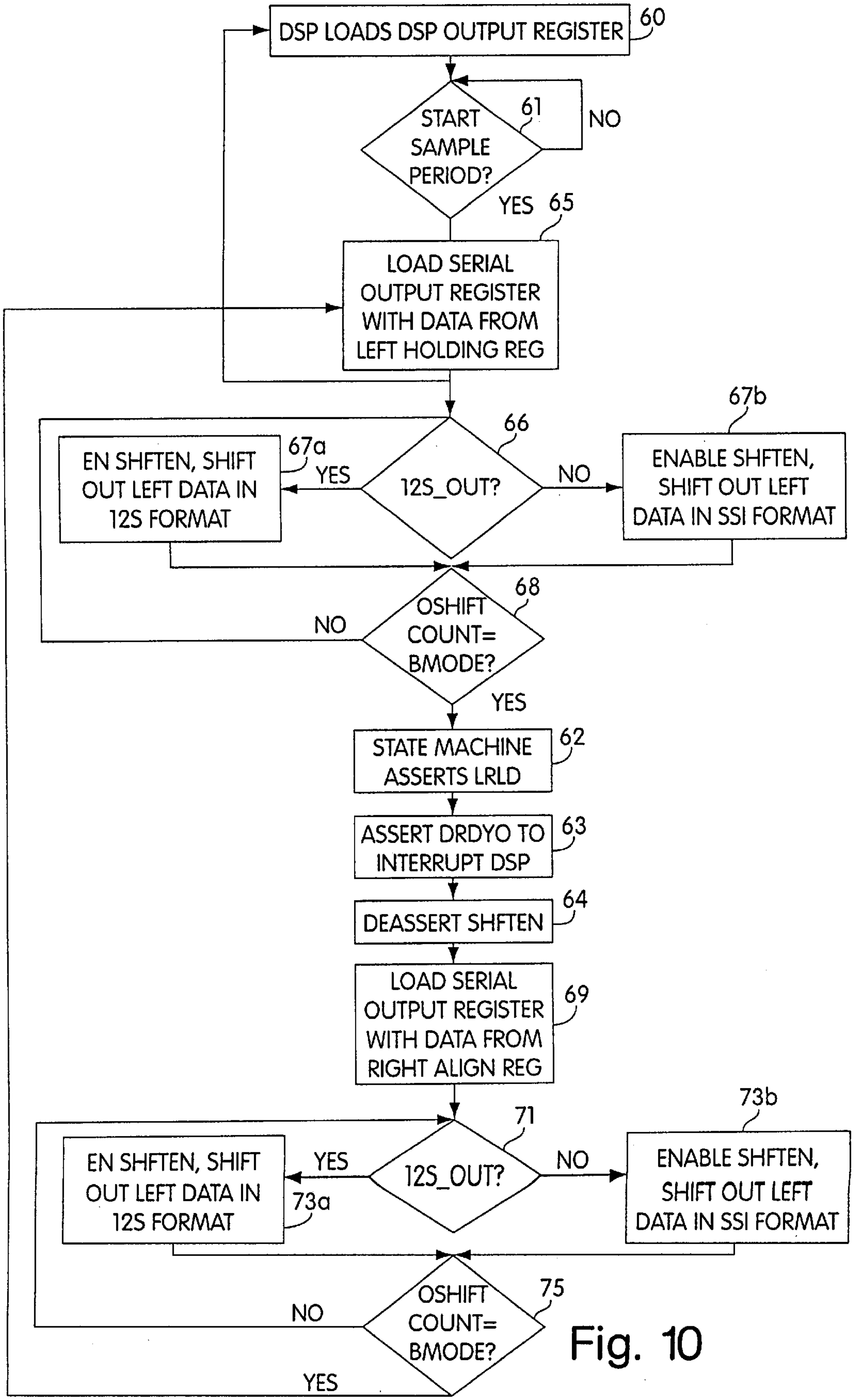
FIG. 10 is a flow diagram illustrating the flow of data through the input serial datapath of FIG. 9.

The method used by the output state machine 53 to control the operation of the serial output datapath block 51*a* will now be described with reference to the flow diagram of FIG. 10. At step 60, the DSP loads data into the DSP output registers 52*a* and 52*b* by forwarding the address of the output register it seeks to load to the memory decode block 72 (FIG. 3). The selection of an output register causes either the LEFT_SEL signal line or the RIGHT_SEL signal line to become asserted for a DSP write or read cycle. For example, when writing both DSP output registers 52*a* and 52*b*, the DSP forwards an address over line 20*a* for the DSP left output register 52*a*, which causes the LEFT_SEL signal to be asserted for a DSP write cycle, and then forwards an address over line 20*a* for the DSP right output register 52*b*, which causes the RIGHT_SEL signal to be asserted for the second DSP write cycle. At step 61 the output state machine waits until the start of the next sample period. In one embodiment, after the start of the sample period, the output state machine waits three data cycles to allow time for data internal to the serial to parallel interface to be moved and stabilized between registers, although this is not a limitation of the invention. At step 65, the output state machine 53 asserts the SHIFT_LD signal, and drives the LEFT_RIGHT signal coupled to the select of multiplexer 56 such that data from the left output holding register 54*a* is loaded into the serial output register 57.

At step 66, the value of the I2S_Out field from the SCR is examined to determine whether data is to be output in $I^2S$ format or SSI format. If it is to be output in $I^2S$ format, then at step 67*a*, at the beginning of the next sample period the SHFTEN signal is enabled, and data is shifted out according $I^2S$ format. However, if I2S_Out field indicates that data is to be output in SSI format, then, at step 67*b*, at the beginning of the next sample period the SHFTEN signal is enabled and data is shifted out in SSI format. At step 68 a comparison is made against the number of bits that have been shifted out, and the value in the BMODEO2:0 field, which indicates the sample size. If the full sample size has not been shifted out, then the process returns to step 66, and data continues to be shifted out in the desired audio format until the entire sample bit width has been output.

In parallel with the process of steps 65–68, where data is being shifted out of the serial datapath block, at steps 62–64 data is being shifted along the output datapath using the holding registers 54*a* and 54*b* and the right alignment register 55.

At step 62, the output state machine 53 asserts the LRLD signal. The effect of asserting the LRLD signal is to forward data from the DSP output registers 52*a* and 52*b* to the holding registers 54*a* and 54*b*, respectively. In addition, the data in the output right holding register 54*b* is forwarded to the right alignment register 55. Once the data has been forwarded from the DSP output registers 52*a* and 52*b* to the holding registers 54*a* and 54*b*, the DSP output registers are again available for writing by the DSP. Accordingly, at step 63 the output state machine asserts a signal DRDY_O to the DSP to interrupt processing of the DSP and notify the DSP of the availability of the registers.

At step 64, when data is moved into the holding registers 54*a* and 54*b*, the output state machine deasserts the SHFTEN signal. The deassertion of the SHFTEN signal causes the SHIFT_SIG, which controls the shifting of data out of the serial shift register, to be disabled.

During the time period that the data in the output left holding register 54*a* was loaded into the serial output register 57, the LRLD signal was asserted, moving the contents of the output right holding register 54*b* to the right alignment register 55. At steps 69 the SHFTEN signal is again deasserted and the serial output register 57 is loaded with data from the right alignment register 55. At step 71 the I2S_Out value is again evaluated. Depending upon the value of the I2S_Out field, either step 73*a* or 73*b* is executed. In both steps, the SHFTEN signal is enabled, and the data is output in the desired format. At step 75, a count of the number of bits shifted out (OSHIFT COUNT) is compared against the bit width indicated by the BMODEO2:0 field. If the full sample size has not been shifted out, the process returns to step 71, and the audio data bits continue to be shifted out in the selected format until the full audio sample width has been provided. Once all of the right channel data has been shifted out, process returns to step 64, where the left channel data, that was loaded with the LRLD signal when the right alignment register was loaded, is shifted out of the serial to parallel interface 13.

Figure 11:
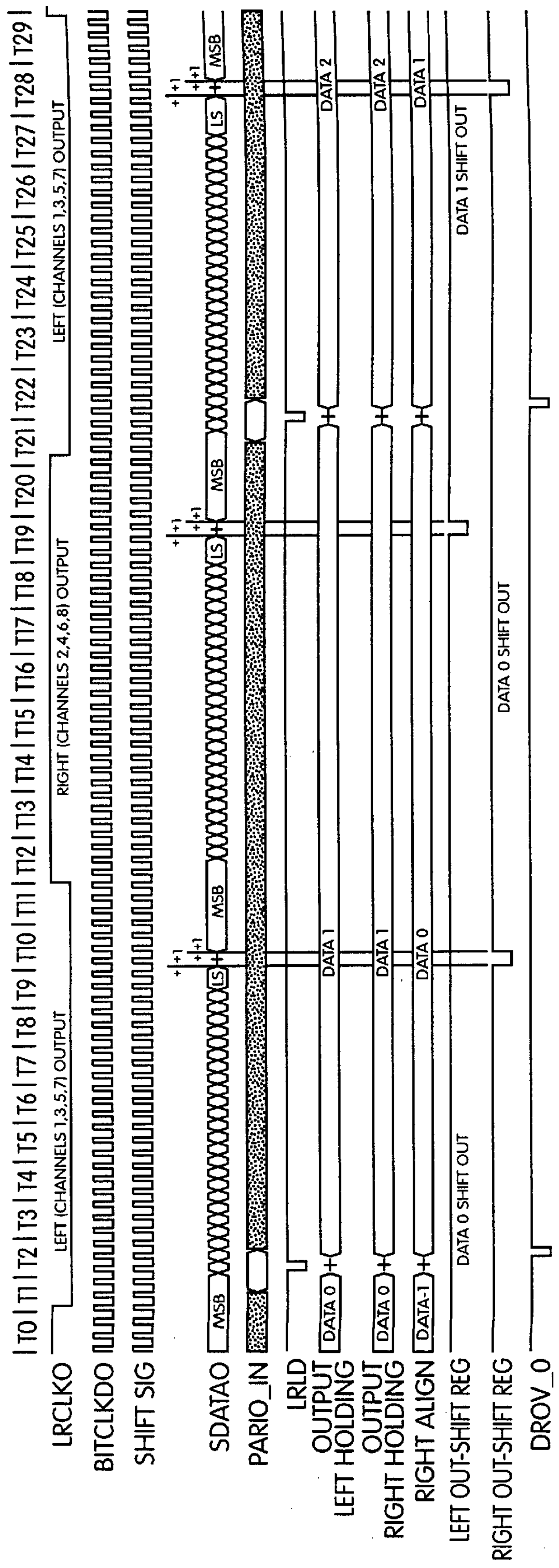
FIG. 11 is a timing diagram illustrating the flow of data through the input serial datapath of FIG. 9.

Referring now briefly to FIG. 11, a timing diagram illustrating the operation of the output state machine 53 and the resulting flow of data through the output serial datapath block 51*a* is provided. Similar to the timing diagram of FIG. 7, the timing diagram of FIG. 11 is apportioned into a series of discrete time intervals T0–T28, where each time interval represents approximately three data cycles within the serial to parallel interface.

In the timing diagram of FIG. 11, DATA1 has previously been loaded into the DSP output registers 52*a* and 52*b*, and DATA0 is in the holding registers 54*a* and 54*b*. During time T0, the SHFT_LD signal (not shown), is asserted, causing the data in left output holding register to be forwarded to the serial output register 57. During time T1, the LRLD signal is asserted, causing DATA1 to be forwarded to the output holding registers 54*a* and 54*b*, and DATA0 to be forwarded from the right holding register 54*b* to the right alignment register 55. DATA0 for the left channel is shifted out of the serial output register from time T0 through time T7. During time T8, the shift output of the serial output register is disabled, and DATA0 from the right alignment register is forwarded to the serial output register. From the time of T10 through T17, the right channel DATA0 is shifted out of the serial output register. In addition, during this time, DATA1 was shifted into the holding registers 54*a* and 54*b*. Therefore, at time T18, DATA1 may be transferred from the left output holding register to the serial output register 57.

Accordingly, one embodiment of a serial to parallel interface for interfacing multiple streams of audio data to multiple digital signal processors has been described that provides a number of advantages over the prior art, hard-wired interface method. First, the serial to parallel interface is capable of receiving serialized input data in a variety of different audio formats, including $I^2S$ format (for audio components manufactured by Philips Corporation) or SSI format (for audio components manufactured by Motorola corporation) and to receive audio data having different bit width formats. Because the serial to parallel interface is capable of handling audio data received in a variety of formats, the DAW may be used to support a variety of audio devices without having to include specialized hardware to support each various device. The audio format and bit-width of the received audio signal are selectable at the serial to parallel converter by simply programming the serial to parallel ASIC to recognize the given data pattern. The programming of the serial to parallel converter may be performed at system start up, or alternatively 'on the fly'; i.e., dynamically during operation by changing the contents of configuration registers as described above.

A second advantage of the described serial to parallel interface is that it is also able to easily accommodate serial audio data that is received at different frequencies because it is controlled by state machines that provide control signals in accordance with the external clocking signals. As a result, the serial to parallel interface may flexibly accommodate different components that operate at different frequencies without any alterations to the design.

A third advantage of the serial to parallel interface 13 is that it includes a double-buffered datapath that guarantees that erroneous data is not propagated to the DSPs, thereby maintaining an overall audio data consistency and facilitating error correction and handling in the DAW. In addition, by providing a double buffered datapath, timing constraints between the serial to parallel interface and the DSP are eased and the DSP may retrieve data when it is convenient, thereby increasing the overall performance of the DSP.

Many of the above advantages, including the ability of the serial to parallel interface to accommodate the various input formats and frequencies, are realized because the serial to parallel interface is formed using a dynamically programmable ASIC. Because the ASIC is dynamically programmable, configuration registers may be altered at startup or during operation in order to program the internal logic to receive and interpret the audio data stream as it is received. In addition, because the ASIC utilizes less space than discrete components, more logic may be included within the ASIC to support an increased number of input/output (I/O) channels. By supporting more I/O channels at the DAW, the overall performance of the DAW is enhanced. Because the serial to parallel interface is a programmable, memory mapped ASIC, it may be programmed to receive serialized input audio data in a variety of different audio formats, including $I^2S$ format (for audio components manufactured by Philips Corporation) or SSI format (for audio components manufactured by Motorola corporation), and different bit width formats. Because the serial to parallel interface is capable of handling audio data received in a variety of formats, the DAW may be used to support a variety of audio devices without having to include specialized hardware to support each various device. In addition, because an ASIC utilizes less space than discrete components, more logic may be included within the serial to parallel interface ASIC to support an increased number of input/output (I/O) channels. By supporting more I/O channels at the DAW, the overall performance of the DAW is increased.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalent thereto.

What is claimed is:

1. A serial to parallel input, and parallel to serial output, interface for coupling at least one audio device capable of transmitting and receiving at least one serial digital audio signal to and from a digital audio workstation, the digital audio workstation comprising at least one digital signal processor capable of transmitting and receiving a plurality of digital audio data in parallel, the interface comprising:

a programmable configuration register for indicating a format of the serial digital audio data from a plurality of formats;

at least one state machine, coupled to the programmable configuration register, for controlling by at least first and second control signals the transfer of data between the digital signal processor and the audio device such that the serial digital audio data is transferred according to the format indicated in the programmable configuration register; and at least one first datapath for transferring the serial digital audio data from the audio device to the digital signal processor responsive to the first control signal, and at least one second datapath for transferring the plurality of digital audio data in parallel from the digital signal processor to the audio device responsive to the second control signal.

2. The interface according to claim 1, wherein the interface includes a memory mapped ASIC.

3. The interface according to claim 1, wherein the plurality of formats includes a plurality of audio formats.

4. The interface according to claim 1, wherein the plurality of formats includes a plurality of audio sample bit width formats.

5. The interface according to claim 1, wherein the state machine is coupled to receive a clock signal from the at least one audio device, and wherein the state machine provides control signals to the first and second datapaths responsive to a frequency of the received clock signal.

6. The interface according to claim 1, wherein the at least one audio device is coupled to exchange eight channels of stereo data to the interface.

7. The interface according to claim 1, wherein the first datapath comprises:

at least one serial shift register, for exchanging data with the audio device;

a first set of buffers comprising at least one buffer, coupled to exchange data with the serial shift register; and a second set of buffers, comprising at least one buffer, coupled to the first set of buffers and to the digital signal processor, wherein the first set of buffers isolates the second set of buffers from the serial shift register to preclude erroneous data from propagating between the digital signal processor and the serial shift register.

8. The interface according to claim 1, wherein the state machine further comprises an input state machine, coupled to the programmable configuration register, for controlling the receipt of the serial digital audio data such that the serial digital audio data is received in the format indicated by the programmable configuration register.

9. The interface according to claim 8, wherein the first datapath further comprises an input datapath for receiving the serial digital audio data and for converting the serial digital audio data into the plurality of digital audio data for transmission in parallel to the at least one digital signal processor responsive to one or more input control signals from the input state machine.

10. The interface according to claim 9, wherein the input control signals indicate an audio format and a bit width of the serial digital audio data.

11. The interface according to claim 9, wherein the input datapath further comprises:

a shift register for shifting the serial digital audio data into the input datapath;

a pair of holding registers, each holding register of the pair coupled to alternately receive data from the shift register; and a pair of output registers, each one of the pair of output registers coupled to one of the pair of holding registers, for receiving data from the associated holding register, wherein data from the pair of output registers is available for transmission in parallel to the digital signal processor.

12. The interface according to claim 11, wherein the input state machine further comprises means for precluding data from being forwarded from the pair of holding registers to the pair of output registers responsive to an error during the receipt of the serial audio data from the audio device.

13. The interface according to claim 1, wherein the state machine further comprises an output state machine, coupled to the programmable configuration register, for controlling the transmission of the serial digital audio data such that the serial digital audio data is transmitted to the audio device in the format indicated by the configuration register.

14. The interface according to claim 13, wherein the second datapath further comprises an output datapath for converting the plurality of digital audio data received in parallel from the digital signal processor into the serial digital audio data for transmission to the audio device responsive to one or more output control signals from the output state machine.

15. The interface according to claim 14, wherein the output control signals indicate an audio format and a bit width of the serial digital audio data.

16. The interface according to claim 14, wherein the output datapath further comprises:

a pair of input registers coupled to the digital signal processor for receiving data in parallel from the digital signal processor;

a pair of holding registers, each one of the pair of holding registers coupled to one of the pair of input registers, for receiving data from the associated input register;

an alignment register, coupled to a first one of the holding registers of the pair; and a shift register, having an output coupled to the audio device and an input coupled to the alignment register and a second one of the holding registers of the pair, for storing data transferred from the alignment register and the second holding register and for serially transmitting the stored data to the audio device.

17. The interface according to claim 1, wherein the plurality of digital audio data are transferred in a plurality of parallel words of data.

18. The interface according to claim 17, wherein each of the plurality of parallel words of data comprises a full sample of an audio signal from a channel of the audio device.

19. The interface according to claim 17, wherein each of the plurality of parallel words of data comprises twenty-four bits of data.

20. A digital audio workstation for storing and manipulating serial digital audio data received from at least one audio device, the workstation comprising:

at least one processor capable of performing digital signal processing functions; and a serial to parallel input, and parallel to serial output, interface coupled to the audio device and to the processor via at least one multi-bit bus, wherein the interface is constructed and arranged to convert the serial digital audio data to parallel data for transmission to the processor on the multi-bit bus, and to convert the parallel data from the processor on the multi-bit bus into serial digital audio data for transmission to the audio device, further wherein the interface is programmable to indicate that the serial digital audio data is in one of a plurality of formats, said interface further including:

a programmable configuration register for storing information identifying the format of the serial digital audio data;

an input state machine, coupled to the programmable configuration register, for controlling the receipt of the serial digital audio data such that the serial digital data is received in the format indicated by the programmable configuration register;

an input datapath for receiving the serial digital audio data and for converting the serial digital audio data into the parallel data for transmission to the processor responsive to one or more input control signals from the input state machine;

an output state machine, coupled to the programmable configuration register, for controlling the transmission of the serial digital audio data such that the serial digital audio data is transmitted in the format indicated by the programmable configuration register; and an output datapath for converting the parallel data received from the processor into the serial digital audio data for transmission to the audio device responsive to one or more output control signals from the output state machine.

21. The digital audio workstation according to claim 20, wherein the input control signals indicate an audio format and a bit width of the serial digital audio data.

22. The digital audio workstation according to claim 20, wherein the input datapath further comprises:

at least one shift register for shifting the serial digital audio data into the input datapath;

a pair of holding registers, each holding register of the pair coupled to alternately receive data from the shift register; and a pair of output registers, each one of the pair of output registers coupled to one of the pair of holding registers, for receiving data from the associated holding register, wherein data from the pair of output registers is available for forwarding to the processor.

23. The digital audio workstation according to claim 22, wherein the input state machine further comprises means for precluding data from being forwarded from the pair of holding registers to the pair of output registers responsive to an error during the receipt of the serial audio data from the audio device.

24. The digital audio workstation according to claim 23, wherein the output control signals indicate an audio format and a bit width of the serial digital audio data.

25. The digital audio workstation according to claim 20, wherein the output datapath further comprises:

a pair of input registers coupled to the processor for receiving data in parallel from the processor;

a pair of holding registers, each one of the pair of holding registers coupled to one of the pair of input registers, for receiving data from the associated input register;

an alignment register, coupled to a first one of the holding registers of the pair; and a shift register, having an output coupled to the audio device and an input coupled to the alignment register and a second one of the holding registers of the pair, for storing data transferred from the alignment register and the second holding register and for serially transmitting the stored data to the audio device.

26. The digital audio workstation according to claim 20, wherein the input control signals and the output control signals are generated respectively by the input state machine and the output state machine in response to one or more external clock signals associated with the serial digital audio data.

27. The digital audio workstation according to claim 20, wherein the parallel data comprise parallel words of data.

28. The digital audio workstation according to claim 27, wherein each parallel word of data comprises a full sample of an audio signal from a channel of the audio device.

29. The digital audio workstation according to claim 27, wherein each parallel word of data comprises twenty-four bits of data.

30. A serial to parallel input, and parallel to serial output, interface for coupling at least one audio device capable of transmitting and receiving at least one serial digital audio signal to a digital audio workstation, the digital audio workstation comprising at least one processor for performing at least one digital signal processing function, the processor being capable of transmitting and receiving a plurality of digital audio data in parallel, the interface comprising:

a programmable configuration register for storing a format of the serial digital audio data from a plurality of formats, wherein the format stored in the programmable configuration register may be updated during operation of the digital audio workstation;

at least one state machine, coupled to the programmable configuration register, for controlling by at least first and second control signals the transfer of data between the processor and the audio device such that the serial digital audio data is transferred according to the format indicated in the programmable configuration register; and at least one first datapath for transferring the serial digital audio data from the audio device to the processor responsive to the first control signal, and at least one second datapath for transferring the plurality of digital audio data in parallel from the processor to the audio device responsive to the second control signal.

31. The interface according to claim 30, wherein the plurality of digital audio data are transferred in a plurality of parallel words of data.

32. The interface according to claim 31, wherein each of the plurality of parallel words of data comprises a full sample of an audio signal from a channel of the audio device.

33. The interface according to claim 32, wherein each of the plurality of parallel words of data comprises twenty-four bits of data.

* * * * *